(12) United States Patent
Yamada et al.

(10) Patent No.: US 9,667,107 B2
(45) Date of Patent: May 30, 2017

(54) MOTOR AND ROTOR

(71) Applicant: Asmo Co., Ltd., Shizuoka-ken (JP)

(72) Inventors: Yoji Yamada, Shizuoka-ken (JP); Seiya Yokoyama, Shizuoka-ken (JP); Keisuke Koide, Shizuoka-ken (JP); Yoshiaki Takemoto, Shizuoka-ken (JP); Shigemasa Kato, Shizuoka-ken (JP)

(73) Assignee: Asmo Co., Ltd., Shizuoka-ken (JP)

( * ) Notice: Subject to any disclaimer, the term of this patent is extended or adjusted under 35 U.S.C. 154(b) by 321 days.

(21) Appl. No.: 14/288,099

(22) Filed: May 27, 2014

(65) Prior Publication Data

US 2014/0265703 A1    Sep. 18, 2014

Related U.S. Application Data

(62) Division of application No. 13/168,636, filed on Jun. 24, 2011, now abandoned.

(30) Foreign Application Priority Data

Jun. 30, 2010 (JP) ................................. 2010-148919
Jul. 13, 2010 (JP) ................................. 2010-158728
Jul. 30, 2010 (JP) ................................. 2010-172982

(51) Int. Cl.
*H02K 1/27* (2006.01)
*H02K 1/24* (2006.01)

(52) U.S. Cl.
CPC .............. *H02K 1/24* (2013.01); *H02K 1/274* (2013.01); *H02K 1/278* (2013.01); *H02K 1/2746* (2013.01); *H02K 2213/03* (2013.01)

(58) Field of Classification Search
CPC ........ H02K 1/27; H02K 1/274; H02K 1/2746; H02K 1/2713; H02K 21/14; H02K 29/03
(Continued)

(56) References Cited

U.S. PATENT DOCUMENTS 4,661,736 A    4/1987 Kawada et al.
4,748,360 A    5/1988 Kawada et al.
(Continued)

FOREIGN PATENT DOCUMENTS

CN    101199103 A    6/2008
JP    04-340340 A    11/1992
(Continued)

OTHER PUBLICATIONS

"Chinese Application Serial No. 201110193679.7, Office Action mailed Aug. 28, 2014", 9 pgs.
(Continued)

*Primary Examiner* — Burton Mullins
(74) *Attorney, Agent, or Firm* — Schwegman Lundberg & Woessner, P.A.

(57) ABSTRACT

A motor including a stator and a rotor. The stator includes teeth and windings. Each tooth has a distal portion defined by a radially inward side of the stator. The rotor, which is arranged inward in the radial direction from the stator, includes a rotor core, magnets, and salient poles. Each salient pole is separated by a void from the magnet that is adjacent in the circumferential direction. The distal portion of each tooth is longer than a radially outward side of each magnet.

2 Claims, 16 Drawing Sheets

(58) Field of Classification Search
USPC .................................................. 310/156.45
See application file for complete search history.

(56) References Cited

U.S. PATENT DOCUMENTS

| | | | |
|---|---|---|---|
| 5,091,668 A | | 2/1992 | Cuenot et al. |
| 5,508,576 A | * | 4/1996 | Nagate .................... C08L 23/02 310/156.54 |
| 6,897,588 B2 | * | 5/2005 | Okubo .................... H02K 29/03 310/156.36 |
| 7,474,028 B2 | * | 1/2009 | Shim ........................ H02K 1/02 310/156.53 |
| 8,242,654 B2 | | 8/2012 | Yamada et al. |
| 2004/0113506 A1 | | 6/2004 | Okubo |
| 2005/0017588 A1 | | 1/2005 | Yamaguchi |
| 2009/0021096 A1 | | 1/2009 | Tatematsu |
| 2010/0133939 A1 | | 6/2010 | Takemoto et al. |
| 2011/0001383 A1 | | 1/2011 | Shimomura et al. |
| 2012/0001509 A1 | | 1/2012 | Yamada et al. |

FOREIGN PATENT DOCUMENTS

| | | | | |
|---|---|---|---|---|
| JP | 07-184334 A | | 7/1995 | |
| JP | 09-322445 A | | 12/1997 | |
| JP | 09-327139 A | | 12/1997 | |
| JP | 11-234931 A | * | 8/1999 | ............... H02K 1/27 |
| JP | 2000-350436 A | | 12/2000 | |
| JP | 2003-143786 A | | 5/2003 | |
| JP | 2003-309939 A | | 10/2003 | |
| JP | 2006-304567 A | | 11/2006 | |
| WO | WO-2009/101874 A1 | | 8/2009 | |

OTHER PUBLICATIONS

"Japanese Application Serial No. 2010-158728, Office Action mailed Feb. 25, 2014", 2 pgs.
"Machine Translation of 09-322445A, published Dec. 12, 1997", 9 pgs.
"Machine Translation of 2003-143786A, published May 16, 2003", 9 pgs.
"Machine Translation of JP 07-184334A, published Jul. 21, 1995", 11 pgs.
"Machine Translation of JP 09-327139A, published Dec. 16, 1997", 9 pgs.
"Machine Translation of JP 2000-350436A, published Dec. 15, 2000", 13 pgs.
"Machine Translation of JP 2006-304567A, published Nov. 2, 2006", 16 pgs.
"Machune Translation of JP 2003-309939A, published Oct. 31, 2003", 9 pgs.
"U.S. Appl. No. 13/168,636, Advisory Action mailed May 5, 2014", 3 pgs.
"U.S. Appl. No. 13/168,636, Final Office Action mailed Feb. 24, 2014", 7 pgs.
"U.S. Appl. No. 13/168,636, Non Final Office Action mailed Jul. 5, 2013", 8 pgs.
"U.S. Appl. No. 13/168,636, Preliminary Amendment filed Jun. 24, 2011", 3 pgs.
"U.S. Appl. No. 13/168,636, Response filed Apr. 24, 2014 to Final Office Action mailed Feb. 24, 2014", 8 pgs.
"U.S. Appl. No. 13/168,636, Response filed Jun. 17, 2013 to Restriction Requirement mailed May 16, 2013", 8 pgs.
"U.S. Appl. No. 13/168,636, Response filed Oct. 4, 2013 to Non Final Office Action mailed Jul. 5, 2013", 11 pgs.
"U.S. Appl. No. 13/168,636, Restriction Requirement mailed May 16, 2013", 7 pgs.

* cited by examiner

MOTOR AND ROTOR

RELATED APPLICATION

This application is a Divisional application of U.S. patent application Ser. No. 13/168,636 filed Jun. 24, 2011, which claims the benefit of priority under 35 U.S.C. §119, to Japanese Patent Application Serial No. 2010-148919, filed on Jun. 30, 2010; Japanese Patent Application Serial No. 2010-158728, filed on Jul. 13, 2010; and to Japanese Patent Application Serial No. 2010-172982, filed on Jul. 30, 2010, which applications are incorporated herein by reference in their entirety.

BACKGROUND OF THE INVENTION

The present invention relates to a motor and a rotor adopting a consequent pole type structure.

Japanese Laid-Open Patent Publication No. 9-327139 describes a motor including a rotor having a so-called consequent pole type structure. In this rotor, magnets functioning as first magnetic poles are arranged along a circumferential direction of a rotor core. Further, salient poles functioning as second magnetic poles are arranged between the magnets and formed integrally with the rotor core.

In a rotor having a consequent pole type structure such as that described in Japanese Laid-Open Patent Publication No. 9-327139, magnets that apply a compelling force (induction) on the magnetic flux are mixed with salient poles that do not apply a compelling force on the magnetic flux. Magnetic flux (interlinkage magnetic flux) ideally passes between the salient poles and an opposing stator (distal portions of the stator's teeth) while also interlinking teeth. However, the interlinkage magnetic flux is directed in another direction and becomes leakage flux that does not contribute to the motor torque and lowers the torque of the motor.

SUMMARY OF THE INVENTION

It is an object of the present invention to provide a motor and a rotor that increase the torque.

One aspect of the present invention is a motor provided with a stator including a plurality of teeth, which extend inward in a radial direction and are arranged along a circumferential direction, and a plurality of windings, which are wound around the teeth. Each tooth includes a distal portion located at a radially inward side of the tooth. A rotor is arranged inward in the radial direction from the stator. The rotor includes a rotor core, a plurality of magnets, which are arranged along a circumferential direction of the rotor core and functions as first magnetic poles, and a plurality of salient poles, which are arranged on the rotor core and function as second magnetic poles. Each of the salient poles is separated by a void from an adjacent one of the magnets in the circumferential direction. The distal portion of the tooth is set to be longer in an axial direction than a magnet pole portion, which is formed at a radially outward side of the rotor in correspondence with each of the magnets.

DETAILED DESCRIPTION OF THE PREFERRED EMBODIMENTS

First Embodiment

A first embodiment of the present invention will be described with reference to FIGS. 1 to 3.

Figure 1:
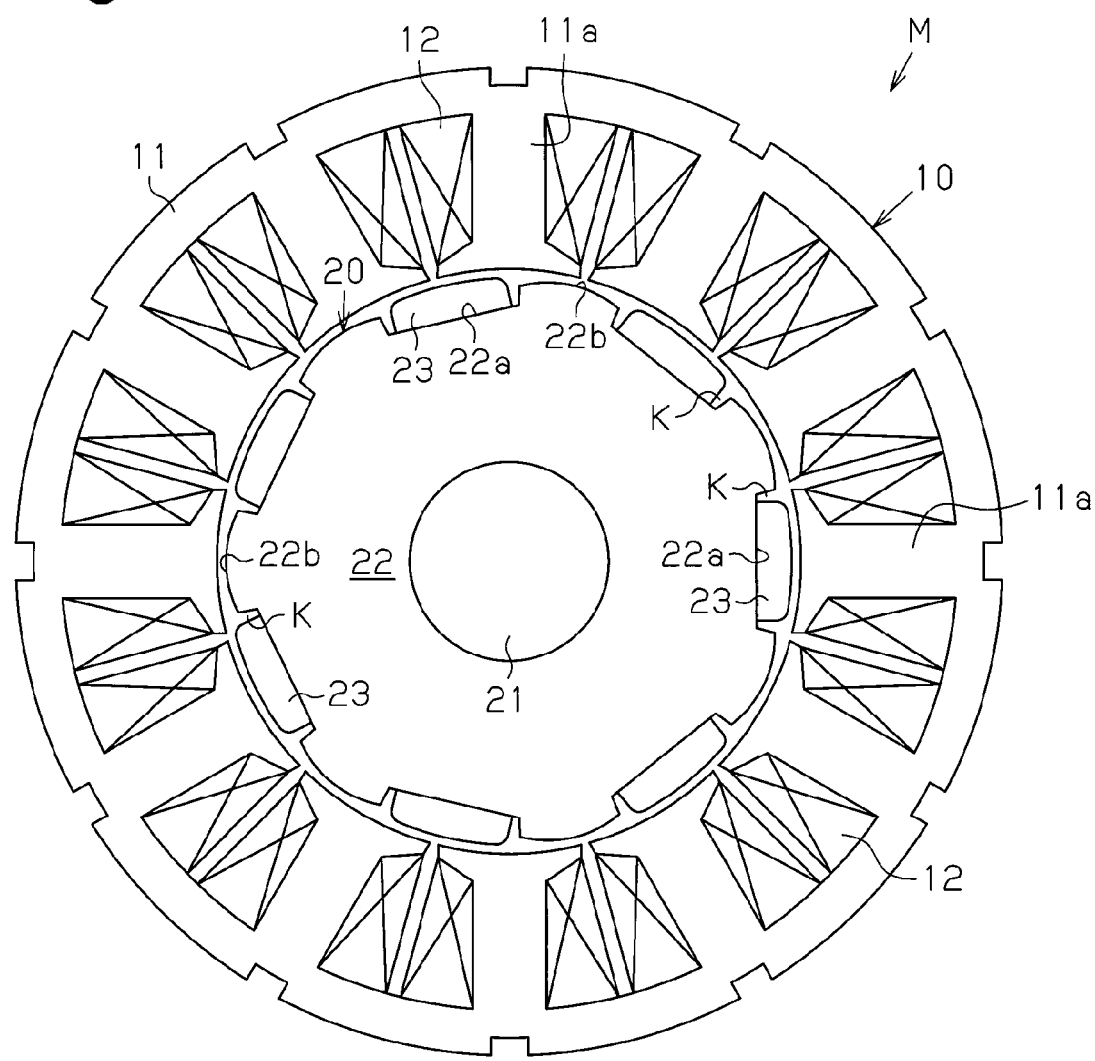
FIG. 1 is a plan view showing a motor according to a first embodiment of the present invention.

FIG. 1 shows an inner rotor type brushless motor M including a stator 10. The stator 10 includes a stator core 11. A plurality of (twelve in the present embodiment) teeth 11a, which extend radially inward from the stator core 11, are arranged in the circumferential direction. A winding 12 is wound around each tooth 11a.

As shown in FIG. 1, a rotor 20 is arranged at the inner side of the stator 10 in the motor M. The rotor 20 includes a ring-shaped rotor core 22, which is fitted to a rotation shaft 21. Seven magnet seats 22a are formed in a circumferential portion of the rotor core 22 at equal angular intervals in the circumferential direction. Seven N pole magnets 23 are arranged on the magnet seats 22a, respectively. A salient pole 22b, which is formed integrally with the rotor core 22, is arranged on the circumferential portion between adjacent ones of the magnets 23. A void J is formed between each salient pole 22b and the adjacent magnet 23. Each void K has the same area when viewed from the axial direction. Thus, the magnets 23 and salient poles 22b are alternately arranged at equal angular intervals (360°/14). The rotor 20 is of a so-called consequent pole type that includes fourteen magnetic poles, in which the salient poles 22b function as S poles and the magnets 23 function as N poles. The rotor 20 of the present embodiment is of a surface permanent magnet type in which the magnets 23 are arranged at a radially outward side (peripheral surface) of the rotor 20, with the magnets 23 functioning as magnet pole portions of the rotor 20.

Figure 2:
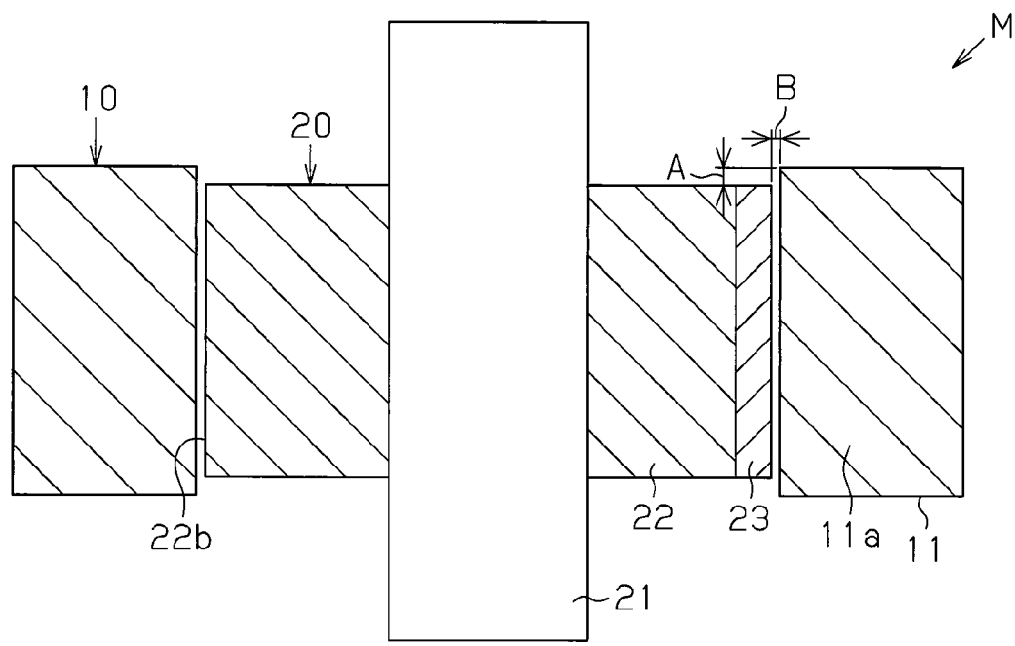
FIG. 2 is a cross-sectional view showing the motor of FIG. 1.

As shown in FIG. 2, each tooth 11a includes a distal portion (radially inward end) that is longer than each magnet 23 of the rotor 20 in the axial direction. In the first embodiment, the axial length of the distal portion of the teeth 11a is set to be the same as the axial length of other portions of the stator core 11 (i.e., annular part of the stator core 11 and parts of the stator core 11 excluding the distal portions of the teeth 11a). Further, the axial length of the magnets 23 is set to be the same as the axial length of the rotor core 22, including the salient poles 22b. FIG. 2 does not shown the winding 12 wound around each tooth 11a.

In FIG. 2, the distal portion of each tooth 11a is projected by a projecting amount A in the axial direction from the magnets 23. Further, the stator 10 and rotor 20 are separated by distance B at the portion where the gap between the stator 10 and rotor 20 is smallest. The ratio of the projecting amount A to the distance B, namely, ratio A/B, is set to satisfy $1.5 \leq (A/B) \leq 2.5$. The distal portion of the tooth 11a is projected by the projecting amount A from each of the two axial ends of the magnet 23. In other words, the axial length of the distal portion of the tooth 11a is set to be greater than the axial length of the magnet 23 by two times the projecting amount A (A×2).

The first embodiment has the advantages described below.

(1) The axial length of the distal portion of each tooth 11a is set to be longer than the axial length of each magnet 23 in the rotor 20. This increases the gap permeance between the rotor 20 and the stator 10 when the tooth 11a faces the magnet 23. Thus, leakage flux decreases and stator interlinkage magnetic flux (i.e., magnetic flux interlinking the teeth 11a of the stator 10) increases. Further, higher torque is obtained.

(2) The ratio A/B, which is the ratio of the projecting amount A in the axial direction of the distal portion of each teeth 11a from the magnets 23 to the distance B in the radial direction between the stator 10 and the rotor 20, is set to satisfy $1.5 \leq (A/B) \leq 2.5$. This increases the stator interlinkage magnetic flux as compared to when the distal portion of each tooth 11a is not projected in the axial direction from the magnets 23, that is, when A/B=0 is satisfied (refer to FIG. 3). Thus, higher torque is obtained. Further, in the range of $1.5 \leq (A/B) \leq 2.5$, the stator interlinkage magnetic flux becomes substantially maximum (see FIG. 3) and the distal portion of the teeth 11a elongated in the axial direction functions effectively when the ratio A/B exceeds 2.5. As a result, a setting that satisfies (A/B)=2.0±0.5 substantially maximizes the stator interlinkage magnetic flux in an effective manner, while easily obtaining the highest torque possible. FIG. 3 shows the stator interlinkage magnetic flux (ratio) plotted by changing the ratio A/B in an experiment. As shown in FIG. 3, when the ratio A/B satisfies $1.5 \leq (A/B) \leq 2.5$, the stator interlinkage magnetic flux takes a substantially maximum value (approximately 101%) as compared to when the axial length of the distal portion of the tooth 11a is the same as the axial length of the magnets 23 (magnet pole portion), that is, when A/B=0 is satisfied. Accordingly, in the present embodiment, the ratio A/B is set to satisfy $1.5 \leq (A/B) \leq 2.5$.

Second Embodiment

A second embodiment of the present invention will now be described with reference to FIG. 4 to FIG. 6. In the second embodiment, like or same reference numerals are given to those components that are the same as the corresponding components of the first embodiment, such as the stator 10. Such components will not be described in detail.

Figure 4:
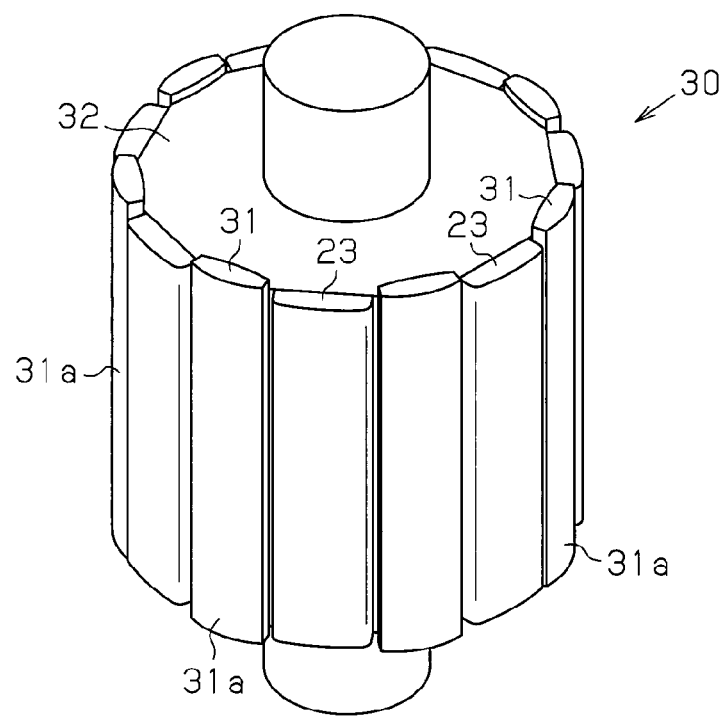
FIG. 4 is a perspective view showing a rotor according to a second embodiment of the present invention.
Figure 5:
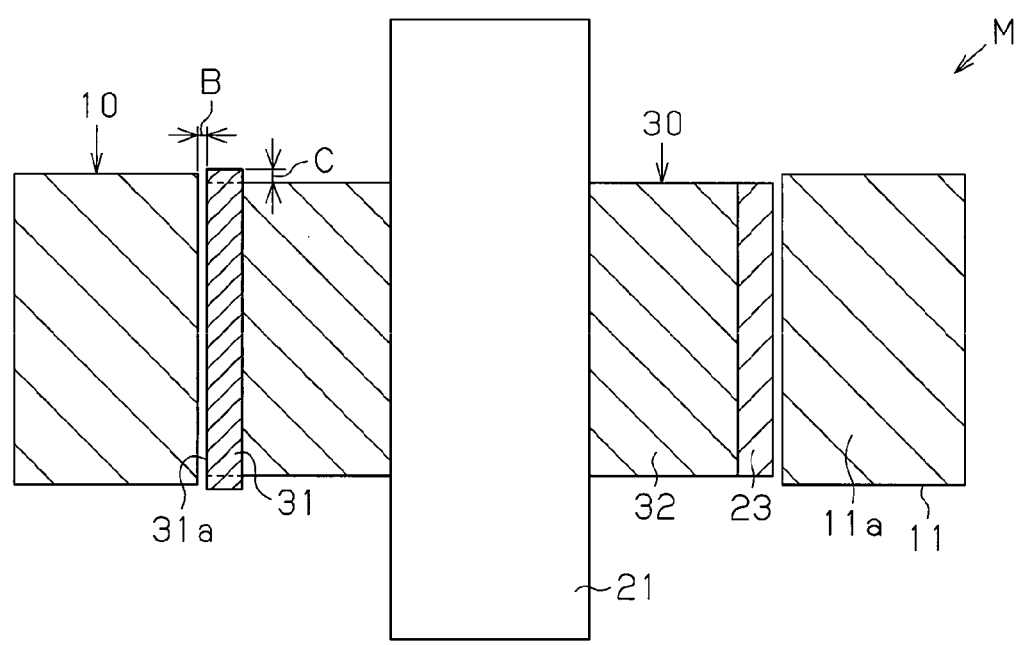
FIG. 5 is a cross-sectional view showing the rotor of FIG. 4.
Figure 6:
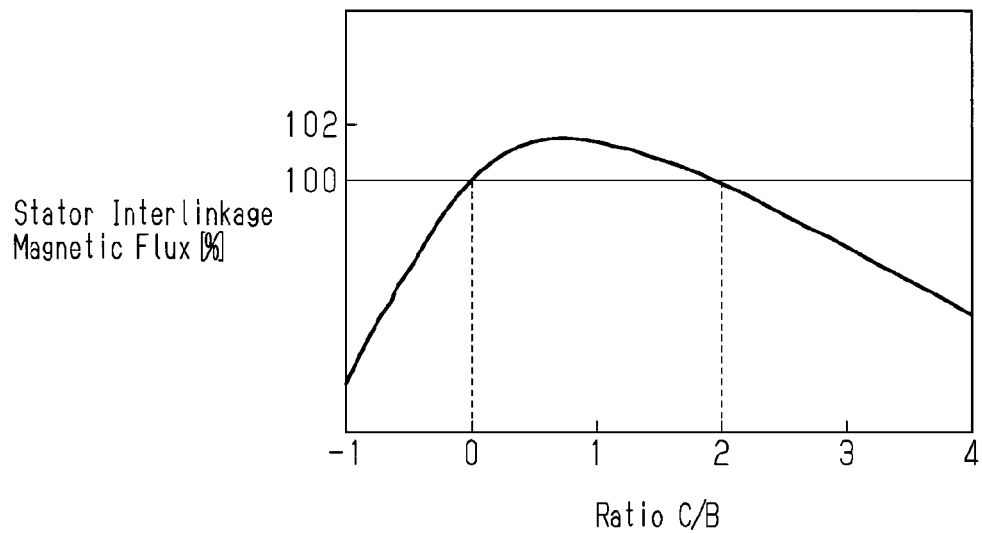
FIG. 6 is a characteristic diagram showing the relationship of a ratio C/B and stator interlinkage magnetic flux.

As shown in FIGS. 4 and 5, a rotor 30 includes salient poles 31a (salient pole members 31), which are longer in the axial direction than the magnets 23 (magnet pole portions). Specifically, each salient pole 31a is formed by a salient pole member 31, which is molded discretely from the rotor core 32 and fixed to the rotor core 32. The salient pole member 31 is formed to have a greater axial length than the magnets 23 and the rotor core 32.

As shown in FIG. 5, each salient pole 31a is projected by a projecting amount C in the axial direction from the magnets 23. Further, the stator 10 and rotor 30 are separated by distance B at the portion where the gap between the stator 10 and rotor 30 is smallest. The ratio of the projecting amount C to the distance B, namely, ratio C/B, is set to satisfy $0<(C/B)<2$. The salient pole 31a is projected by the projecting amount C from each of the two axial ends of the magnet 23. In other words, the axial length of the salient pole 31a is set to be greater than the axial length of the magnet 23 by two times the projecting amount C (C×2). Further, the axial length of the stator core 11 (distal portion of each tooth 11a) is set to be less than the axial length of each salient pole 31a but greater than the axial length of each magnet 23, as shown in FIG. 5.

The second embodiment has the advantages described below.

(3) The axial length of the salient pole 31a is set to be greater than the axial length of the magnet 23. Thus, the portions of each salient pole 31a projected in the axial direction from the magnets 23 increase the gap permeance between the rotor 30 and the stator 10. This decreases the leakage flux, increases the stator interlinkage magnetic flux, and obtains a higher torque.

(4) The ratio C/B, which is the ratio of the projecting amount C of each salient pole 31a in the axial direction from the magnets 23 to the distance B in the radial direction between the stator 10 and the rotor 30 is set to satisfy $0 \leq (C/B) < 2$. Thus, the stator interlinkage magnetic flux is increased compared to when the salient pole 31a is not projected in the axial direction from the magnets 23, that is, when C/B=0 is satisfied (refer to FIG. 6). This obtains higher torque. FIG. 6 shows the stator interlinkage magnetic flux (ratio) plotted by changing the ratio C/B in an experiment. As shown in FIG. 6, when the ratio C/B satisfies $0 \leq (C/B) < 2$, the stator interlinkage magnetic flux increases as compared to when the axial length of the salient pole 31a is the same as the axial length of the magnet 23, that is, when C/B=0 is satisfied. Thus, the ratio C/B is set to satisfy 0≤(C/B)<2. As shown in FIG. 6, when the ratio C/B satisfies 0.5≤(C/B)≤1.0, the stator interlinkage magnetic flux takes a substantially maximum value (approximately 101.5%). It is this desirable that the ratio C/B be set to satisfy 0.5≤(C/B)≤1.0 in order to obtain the highest torque possible.

The first and second embodiments may be modified as below.

In the first embodiment, the ratio A/B of the projecting amount A in the axial direction of the distal portion of each tooth 11a from the magnets 23 and the distance B in the radial direction between the stator 10 and the rotor 20 is set to satisfy 1.5≤(A/B)≤2.5 but not limited in such a manner and may be set to satisfy 0<(A/B)≤1.5.

Figure 3:
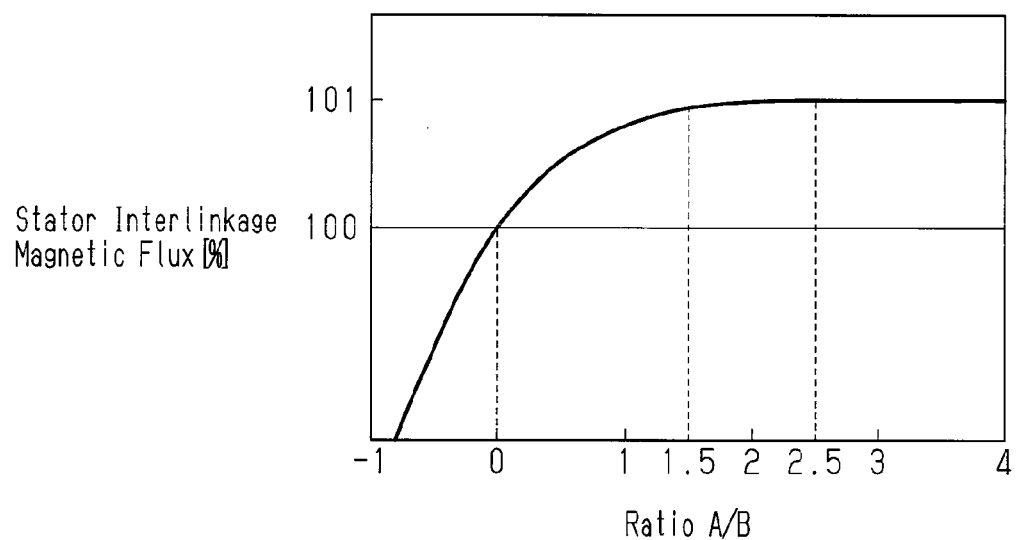
FIG. 3 is a characteristic diagram showing the relationship of a ratio A/B and stator interlinkage magnetic flux.

The stator interlinkage magnetic flux still becomes greater than when the distal portion of the teeth 11a is not projected in the axial direction with respect to the magnet 23 (when A/B=0) (see FIG. 3). Therefore, higher torque is obtained. Furthermore, in the range of 0<(A/B)≤1.5, the stator interlinkage magnetic flux increases as the ratio A/B (projecting amount A) becomes greater (see FIG. 3), so that the distal portion of the teeth 11a is not made uselessly long in the axial direction. Specifically, FIG. 3 shows the stator interlinkage magnetic flux (ratio) when the ratio A/B is changed by experiment. As shown in FIG. 3, when the ratio A/B satisfies 0<(A/B)≤1.5, the stator interlinkage magnetic flux becomes greater and the stator interlinkage magnetic flux increases as the ratio A/B becomes greater compared to when the axial length of the distal portion of the teeth 11a is the same as the axial length of the magnet 23 (when A/B=0). In the present example, therefore, the ratio A/B is set to satisfy 0<(A/B)≤1.5.

Figure 7A:
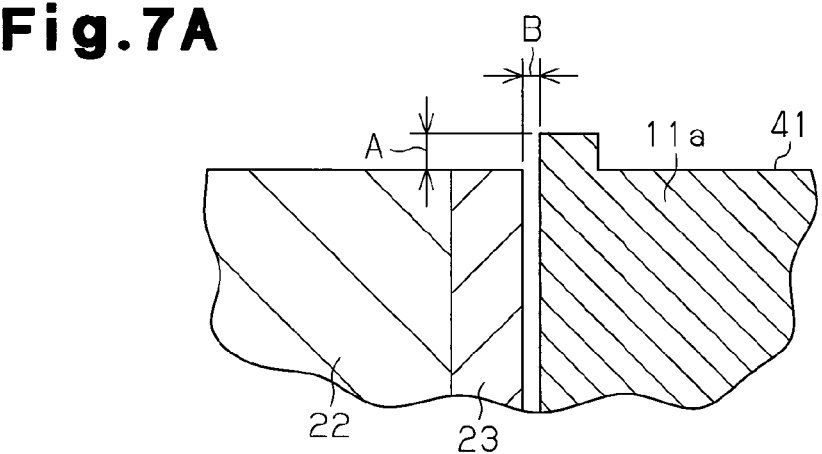
FIGS. 7A and 7B are partial cross-sectional views showing a motor according to another example.
Figure 7B:
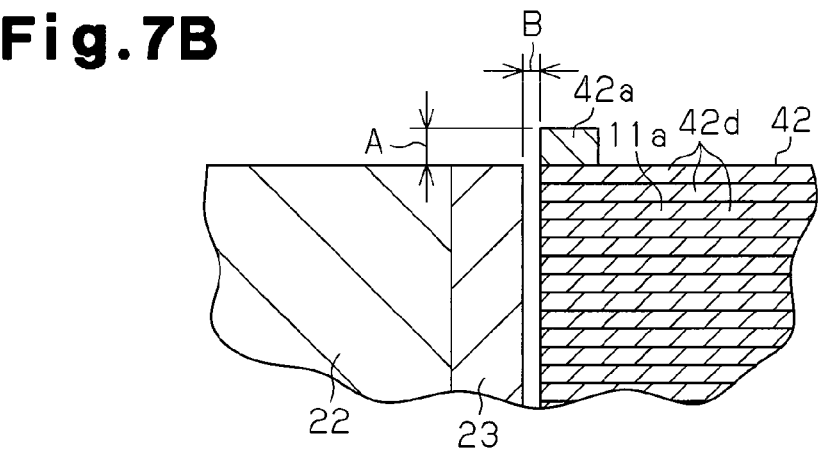

In the first embodiment, the axial length of the distal portion of the teeth 11a is the same as the axial length of the other portion of the stator core 11 (other than distal portion or annular portion of the teeth 11a), but is not limited thereto, and only the distal portion of the teeth 11a may be modified to have a long axial length, as shown in FIGS. 7A and 7B.

Specifically, although the detailed configuration of the stator core 11 is not particularly mentioned in the first embodiment, a stator core 41 may be manufactured by SMC molding, or the like such that only the distal portion (radially inward end) of the teeth 11a in the stator core 41 has a long axial length, as shown in FIG. 7A.

Furthermore, as shown in FIG. 7B, substantially the entire stator core 42 may be manufactured by stacking a core sheet 42d, and a separate member 42a may be fixed and arranged at a relevant portion such that only the distal portion (radially inward end) of the teeth lie has a long axial length.

The advantages similar to the advantages of the first embodiment can be obtained in this manner. Furthermore, the projecting amount in the axial direction of the winding 12 (see FIG. 1) wound around the teeth 11a can be suppressed, and miniaturization of the motor M in the axial direction can be achieved.

The rotors 20 and 30 of the first and second embodiments are of surface permanent magnet types in which the magnets 23 are arranged on the radially outward sides (circumferential surface) of the rotors 20 and 30. However, the rotors 20 and 30 are not limited to such a structure and may be changed to interior permanent magnet type rotors. In this case, a magnet pole portion that faces the stator 10 is formed at a radially outward side of the rotor core in correspondence with each magnet. Thus, when the rotor 20 of the first embodiment is changed to a interior permanent magnet type rotor, the axial length of the distal portion of each teeth 11a is set to be greater than the axial length of the magnet pole portion.

Third Embodiment

Figure 8A:
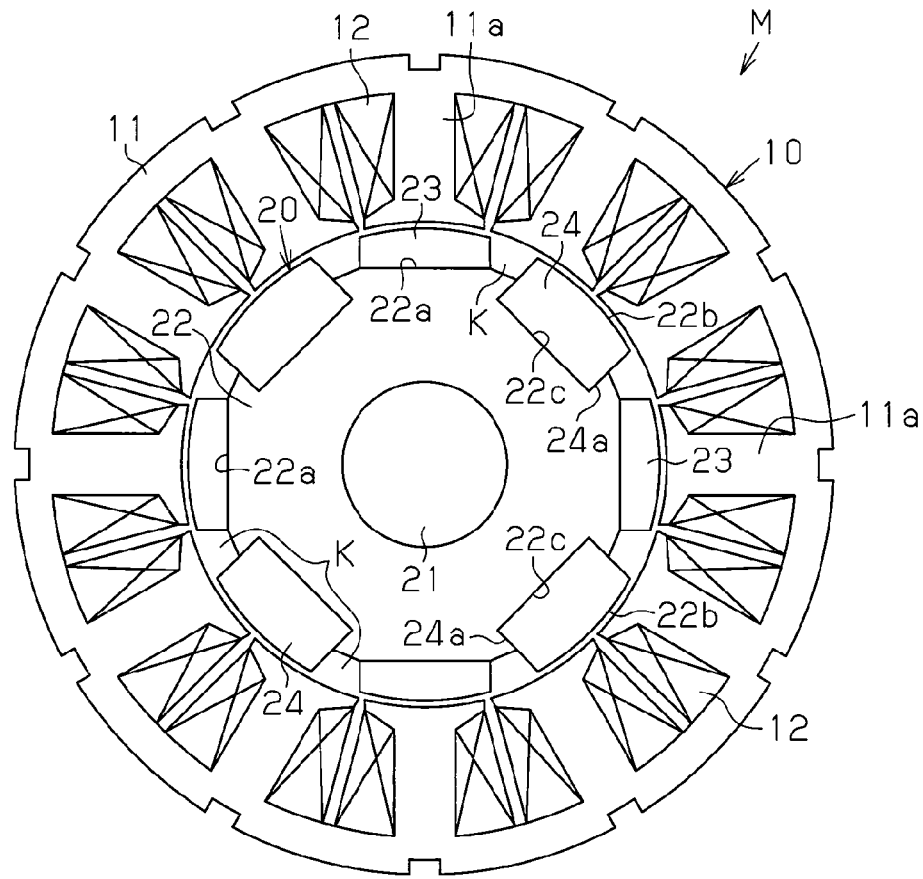
FIG. 8A is a plan view showing a motor according to a third embodiment of the present invention.
Figure 8B:
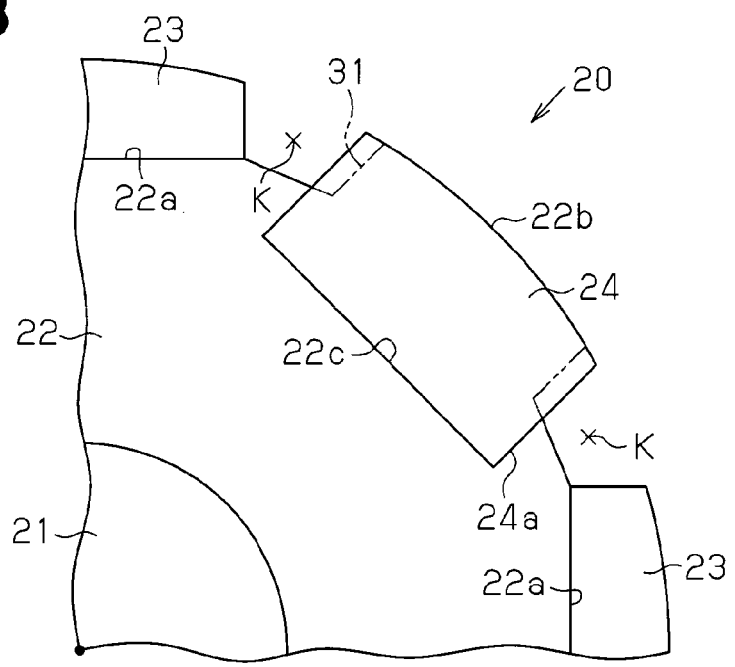
FIG. 8B is a partially enlarged plan view showing the rotor of FIG. 8A.

A third embodiment of the present invention will now be described with reference to FIGS. 8A and 8B. In the third embodiment, like or same reference numerals are given to those components that are the same as the corresponding components of the first embodiment. Such components will not be described in detail.

Four magnet seats 22a are formed on the circumferential portion of a rotor core 22 in the circumferential direction at 90° intervals. Four N pole magnet 23 are arranged on the four magnet seats 22a, respectively. A salient pole 22b is arranged between adjacent ones of the magnets 23 on the circumferential portion of the rotor core 22. A void K is provided between the salient pole 22b and the adjacent magnet 23. Each magnet 23 is arranged between two voids K having the same area so that each side of a line extending radially through the center of the magnet 23 is symmetric to the other side. Each void K is formed so as to maintain same area throughout the axial direction of the rotor core 22. Thus, the magnets 23 and salient poles 22b are alternately arranged at equal angular intervals of 45°. The rotor 20 is of a so-called consequent pole type including eight magnetic poles, in which the salient poles 22b function as S poles and the magnets 23 function as N poles.

The salient poles 22b (portion projecting radially outward) are formed by the salient pole members 24 molded discretely from the rotor core 22 and fixed to the rotor core 22.

More specifically, a seat recess 22c, which is recessed inward in the radial direction, is formed in the rotor core 22 at a position corresponding to each salient pole member 24 between adjacent ones of the magnets 23 in the circumferential direction. The seat recess 22c of the third embodiment is formed to have a constant width in a direction orthogonal to the radial direction as viewed from the axial direction.

Each salient pole member 24, which includes a seat portion 24a and a salient pole 22b, is block-shaped. The salient pole member 24 includes an arcuate surface facing the teeth 11a. The seat portion 24a is fitted into the seat recess 22c. The salient pole 22b projects radially outward from the rotor core 22 and is separated by a void K from the adjacent one of the magnets 23 in the circumferential direction. The salient pole member 24 is fixed to the rotor core 22 when the seat portion 24a is press-fitted into the seat recess 22c.

The salient pole members 24 are formed from a material having higher magnetic permeability than the material of the rotor core 22. Specifically, in the third embodiment, the rotor core 22 is formed from iron (SPCC etc.), and the salient pole members 24 are formed from an electromagnetic steel sheet, amorphous material, permalloy, or the like.

The third embodiment has the advantages described below.

(5) The salient pole 22b is formed by the salient pole member 24 molded as a separate body from the rotor core 22 and fixed to the rotor core 22. Thus, the rotor may be changed to a rotor of various specifications by simply changing the salient pole member 24 with components other than the salient pole member 24 (rotor core 22 and magnet 23) as common components. For instance, the rotor of optimum rotation property (optimum flow of magnetic flux) corresponding to the stator is obtained by simply changing the salient pole member 24 according to the number of teeth 11a and the distal end shape. Specifically, as shown with a chain double dashed line in FIG. 8B, the rotor of optimum rotation property (optimum flow of magnetic flux) corresponding to a different stator is obtained by changing to the salient pole member 31 having a salient pole which width in the direction orthogonal to the radial direction is narrower than the salient pole 22b. The rotor of inexpensive specification and furthermore, the motor M of inexpensive specification is obtained by using iron (SPCC etc.) same as the rotor core 22 for the material of the salient pole member 24.

(6) The salient pole member 24 is formed from a material having higher magnetic permeability than the material of the rotor core 22. This increases the gap permeance of the salient pole members 24 and the stator 10 (teeth 11a), and higher torque is obtained. When the rotor core 22 is formed from an inexpensive iron (such as SPCC etc.), and the salient pole members 24 are formed from a material having high magnetic permeability, such as electromagnetic steel sheet, amorphous material, and permalloy, which are expensive, as in the third embodiment, higher torque is obtained while suppressing material cost compared to when manufacturing the entire rotor core, including the salient poles, with a material having high magnetic permeability.

Fourth Embodiment

Figure 9:
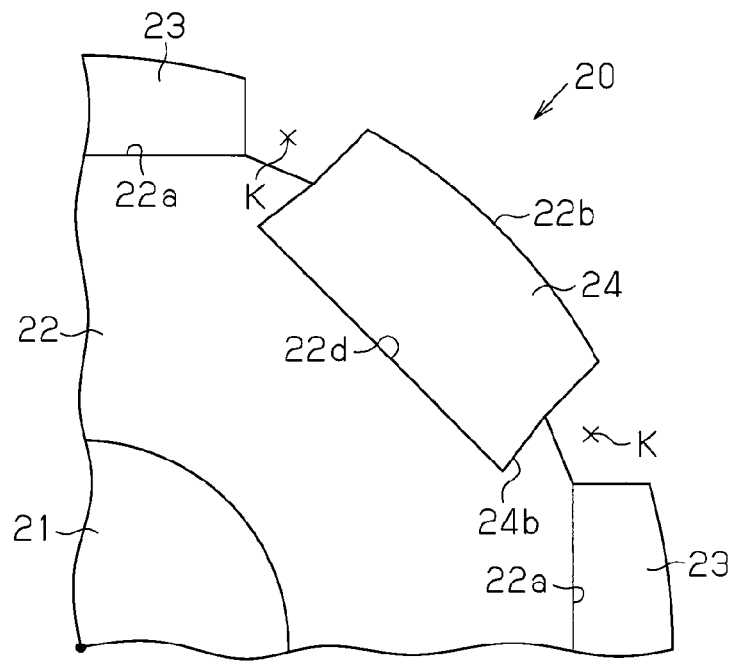
FIG. 9 is a partially enlarged plan view showing a rotor according to a fourth embodiment of the present invention.

A fourth embodiment of the present invention will now be described with reference to FIG. 9. In the fourth embodiment, like or same reference numerals are given to those components that are the same as the corresponding components of the third embodiment. Such components will not be described.

In the fourth embodiment, the rotor core 22 includes seat recesses 22d and each salient pole member 24 includes a seat portion 24b. The seat recesses 22d and seat portions 24b of the fourth embodiment differ from the seat recesses 22c and the seat portions 24a of the third embodiment. Specifically, the seat recess 22d and the seat portion 24b are formed such that the width in a direction orthogonal to the radial direction increases inward in the radial direction as viewed from the axial direction. The seat recess 22d and the seat portion 24b extend throughout the entire rotor core 22 and salient pole member 24 in the axial direction. When press-fitting and coupling the salient pole member 24 to the rotor core 22, the rotor core 22 and the salient pole member 24 are moved relatively to each other in the axial direction.

The fourth embodiment has the following advantage.

(7) The seat recess 22d and the seat portion 24b are formed such that the width in a direction orthogonal to the radial direction increases inward in the radial direction as viewed from the axial direction. Thus, separation of the salient pole member 24 from the rotor core 22 is firmly prevented with a simple structure.

Fifth Embodiment

Figure 10:
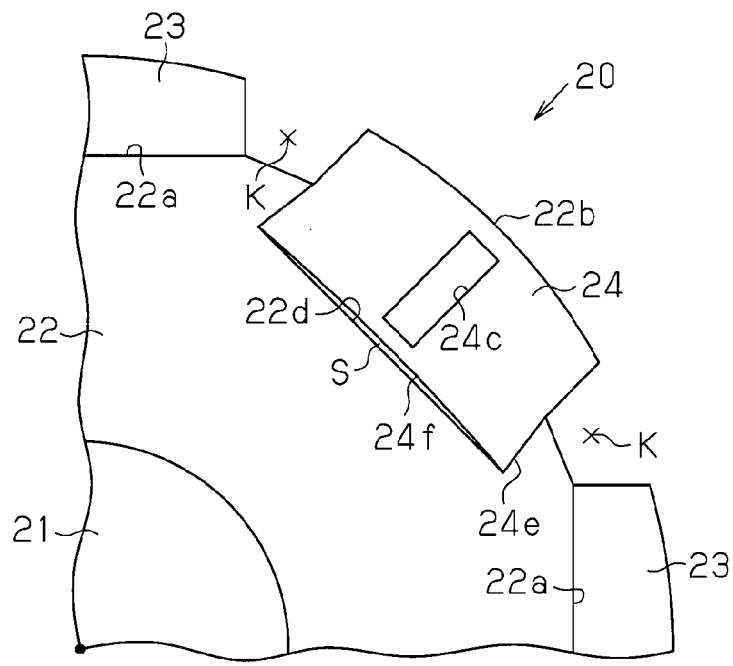
FIG. 10 is a partially enlarged plan view showing a rotor according to a fifth embodiment of the present invention.

A fifth embodiment of the present invention will now be described with reference to FIG. 10. In the fifth embodiment, like or same reference numerals are given to those components that are the same as the corresponding components of the fourth embodiment. Such components will not be described.

The salient pole member 24 of the fifth embodiment includes a slit 24c, which extends in the radial direction at the middle of the salient pole member 24 in a direction orthogonal to the radial direction as viewed from the axial direction. Further, the salient pole member 24 includes a seat recess 22d and seat portion 24e that differ from the seat recess 22d and the seat portion 24b of the fourth embodiment. Specifically, as viewed in the axial direction, the seat recess 22d and the seat portion 24e are formed such that the surfaces facing toward each other in the radial direction are separated from each other by a space S while the surfaces facing toward each other in a direction orthogonal to the radial direction are in contact with each other. More specifically, the radially inward surface of the seat recess 22d is flat, whereas a radially inward surface 24f of the seat portion 24e is curved as viewed in the axial direction.

The fifth embodiment has the advantages described below.

(8) The salient pole member 24 includes the slit 24c, which extends in the radial direction and which is located at the middle of the salient pole member 24 in the direction orthogonal to the radial direction as viewed from the axial direction. The slit 24c is located where the magnetic resistance increases. Thus, satisfactory flow of magnetic flux is obtained between the salient pole 22b and the magnets 23 arranged on opposite sides of the salient pole 22b in the circumferential direction (rectified to suppress bias). Further, the slit 24c results in easy bending of the seat portion 24e in the direction orthogonal to the radial direction, that is, the circumferential direction. Thus, the seat portion 24d is easily press-fitted and fixed to the seat recess 22d so that the two surfaces of seat portion 24d come into contact under pressure with the seat recess 22d. As a result, the pressurized contact suppresses an increase in the magnetic resistance at the seat portion 24e, allows for further satisfactory flow of the magnetic flux between the salient pole 22b and the magnets 23 arranged on opposite sides of the salient pole 22b in the circumferential direction. This facilitates manufacturing (coupling).

(9) As viewed in the axial direction, the seat recess 22d and the seat portion 24e are formed such that a space S is formed between the surfaces facing toward each other in the radial direction, while the surfaces facing toward each other in the direction orthogonal to the radial direction are in contact with each other. Thus, the flow of the magnetic flux inward from the salient pole member 24 in the radial direction is suppressed, and satisfactory flow of the magnetic flux between the salient pole 22b and the magnets 23 arranged on opposite sides of the salient pole 22b in the circumferential direction is obtained.

Sixth Embodiment

Figure 11A:
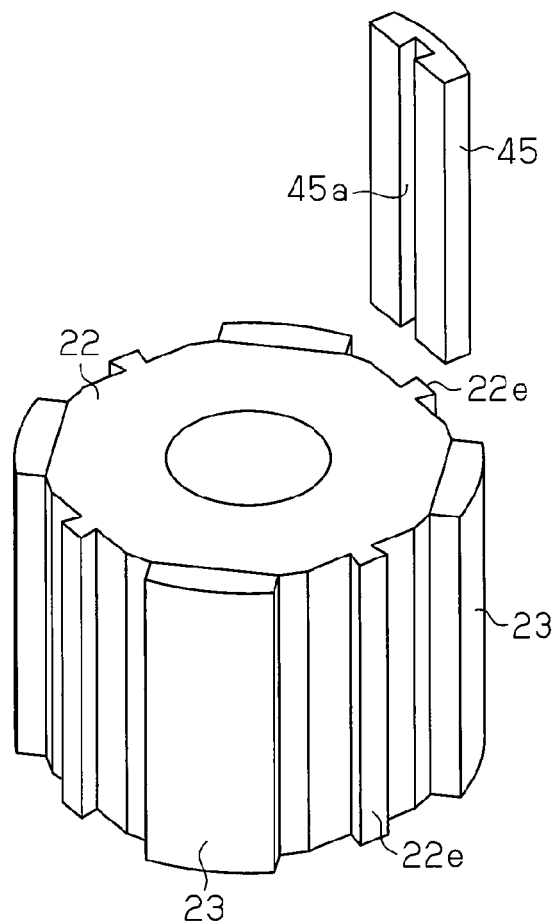
FIG. 11A is a partially exploded perspective view showing a rotor according to a sixth embodiment of the present invention.
Figure 11B:
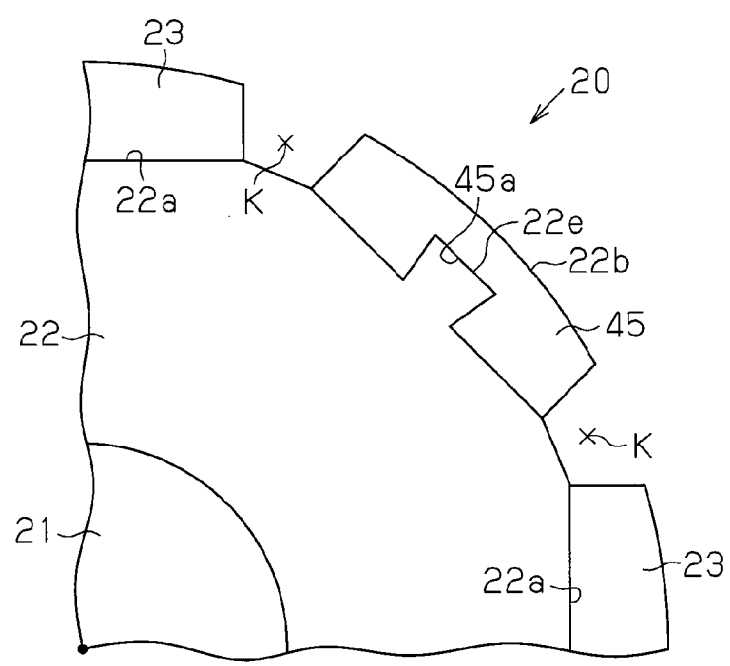
FIG. 11B is a partially enlarged plan view showing the rotor of FIG. 11A.

A sixth embodiment of the present invention will now be described with reference to FIGS. 11A and 11B. In the sixth embodiment, like or same reference numerals are given to those components that are the same as the corresponding components of the third embodiment. Such components will not be described.

In the sixth embodiment, when viewed in the axial direction, a seat projection 22e projects outward in the radial direction from the rotor core 22 at the middle of a portion corresponding to a salient pole member 45 in the direction orthogonal to the radial direction. The salient pole member 45 includes a seat groove 45a to which the seat projection 22e is fitted. As viewed in the axial direction, the seat projection 22e and the seat groove 45a are formed so that the width in a direction orthogonal to the radial direction increases outward in the radial direction. As shown in FIG. 11A, the seat projection 22e and the seat groove 45a are formed throughout the entire rotor core 22 and salient pole member 45 in the axial direction. When the salient pole member 45 is press-fitted and coupled to the rotor core 22, the rotor core 22 and the salient pole member 45 are moved relative to each other in the axial direction.

The sixth embodiment has the advantages described below.

(10) The seat projection 22e projects outward in the radial direction from the middle of the salient pole member 45 in the direction orthogonal to the radial direction as viewed from the axial direction at the position corresponding of the rotor core 22. The salient pole member 45 includes the seat groove 45a to which the seat projection 22e is fitted. Thus, the magnetic resistance at the middle of the salient pole member 45, which is the fitted (contact) portion, becomes high. The flow of magnetic flux between the salient pole 22b and the magnets 23 arranged at opposite sides of the salient pole 22b in the circumferential direction is rectified to suppress bias. This obtains a satisfactory flow of magnetic flux. In particular, when the salient pole member 45 is formed from a material having higher magnetic permeability than the material of the rotor core 22, the magnetic resistance also becomes high at the seat projection 22e, which is arranged in the middle. Thus, magnetic flux between the salient pole 22b and the two magnets 23b are rectified to suppress bias obtain a satisfactory flow.

(11) The seat projection 22e and the seat groove 45a are formed such that the width in the direction orthogonal to the radial direction increase outward in the radial direction as viewed from the axial direction. This firmly prevents outward separation of the salient pole member 45 in the radial direction with a simple structure. The seat projection 22e and the seat groove 45a may be modified so that the width orthogonal to the radial direction is constant as viewed in the axial direction. This also obtains advantage (10).

Seventh Embodiment

Figure 12:
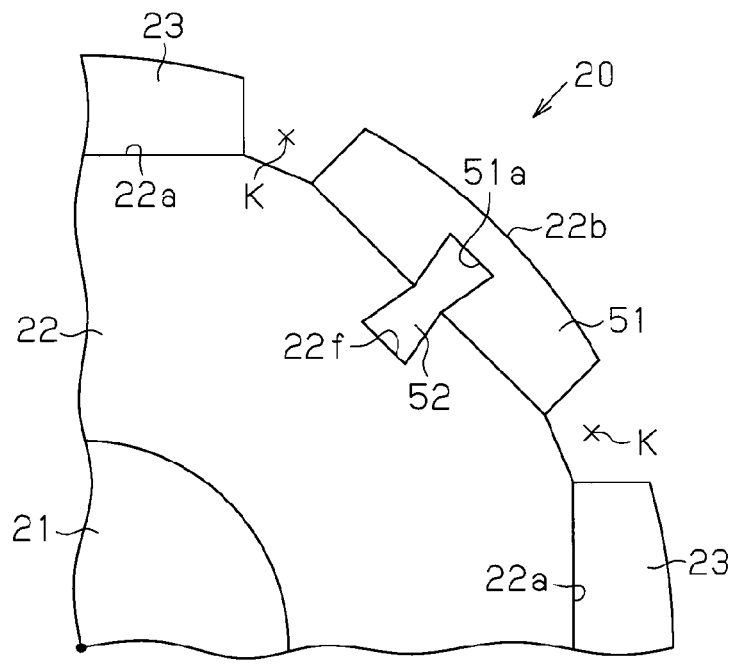
FIG. 12 is a partially enlarged plan view showing a rotor according to a seventh embodiment of the present invention.

A seventh embodiment of the present invention will now be described with reference to FIG. 12. In the seventh embodiment, like or same reference numerals are given to those components that are the same as the corresponding components of the third embodiment. Such components will not be described.

In the seventh embodiment, the rotor core 22 includes a first coupling recess 22f extending inward in the radial direction from the middle of a portion corresponding to a salient pole member 51 in the direction orthogonal to the radial direction as viewed from the axial direction. The salient pole member 51 includes a second coupling recess 51a extending outward in the radial direction from a portion facing toward the first coupling recess 22f. The rotor core 22 and the salient pole member 51 are fixed and coupled to each other by a single coupling member 52 fitted into the first and second coupling recesses 22f and 51a. In this case, the opposing surfaces of the rotor core 22 and salient pole member 51 are in contact with each other except at the first and second coupling recesses 22f and 51a. The first coupling recess 22f and the portion of the coupling member 52 fitted therein are formed so that the width in the direction orthogonal to the radial direction increases inward in the radial direction as viewed in the axial direction. The second coupling recess 51a and the portion of the coupling member 52 fitter therein are formed so that the width in the direction orthogonal to the radial direction increases outward in the radial direction as viewed in the axial direction. When press-fitting and coupling the coupling member 52 to the first and second coupling recesses 22f and 51a, which extend entirely throughout the rotor core 22 and the salient pole member 51, the coupling member 52 is moved relatively to the first and second coupling recesses 22f and 51a in the axial direction. The coupling member 52 is formed from a material having lower magnetic permeability than the material of the salient pole member 51. For example, the coupling member 52 is formed from a resin material, SUS, or brass.

The seventh embodiment has the advantages described below.

(12) The first coupling recess 22f extends inward in the radial direction from the middle of a portion in the rotor core 22 corresponding to the salient pole member 51 in the direction orthogonal to the radial direction as viewed from the axial direction. The salient pole member 51 includes the second coupling recess 51a, which extends outward in the radial direction from a portion facing toward the first coupling recess 22f. The single coupling member 52 is fitted into the first and second coupling recesses 22f and 51a to fix (couple) the rotor core 22 and the salient pole member 51 to each other. This increases the magnetic resistance at the middle of the salient pole member 51, which is the fitted (contact) portion. The flow of magnetic flux between the salient pole 22b and the magnets 23 arranged at opposite sides of the salient pole 22b in the circumferential direction is rectified to suppress bias. This obtains a satisfactory flow of magnetic flux.

(13) The coupling member 52 is formed from a material having lower magnetic permeability than the material of the salient pole member 51. This increases the magnetic resistance of the coupling member 52, which is arranged at the middle. Thus, the flow of magnetic flux between the salient pole 22b and the magnets 23 arranged at opposite sides of the salient pole 22b in the circumferential direction is rectified to suppress bias. This obtains a satisfactory flow of magnetic flux.

Eighth Embodiment

Figure 13:
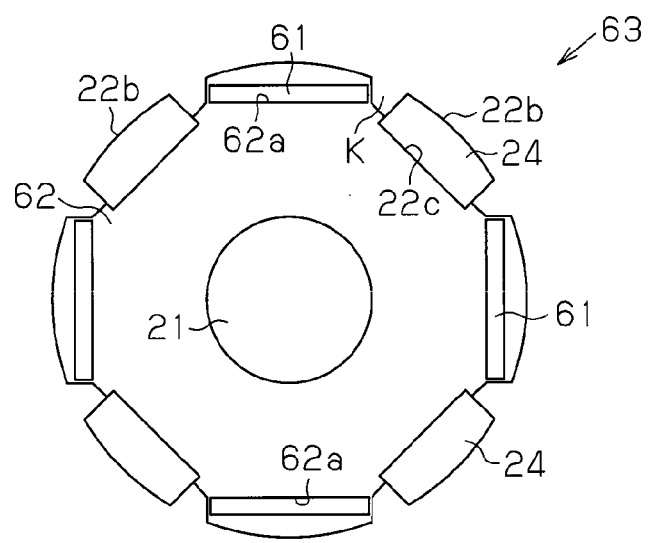
FIG. 13 is a plan view showing a rotor according to an eighth embodiment of the present invention.

An eighth embodiment of the present invention will now be described with reference to FIG. 13. In the eighth embodiment, like or same reference numerals are given to those components that are the same as the corresponding components of the third embodiment. Such components will not be described.

In the third embodiment, the rotor 20 is of a surface permanent magnet type. A rotor 63 of the eighth embodiment is a so-called consequent pole type. The rotor 63 is also of an interior permanent magnet (IPM) type in which magnets 61 are embedded in a rotor core 62. More specifically, magnet insertion holes 62a are formed in the rotor core 62 at portions corresponding to magnet seats 22a of the third embodiment. A magnet 61 is held in each magnet insertion hole 62a. This structure obtains the same advantages as the third embodiment. The rotors 20 of the fourth to seventh embodiments may be changed to interior permanent magnet (IPM) rotors in the same manner as in the eighth embodiment.

Ninth Embodiment

Figure 14A:
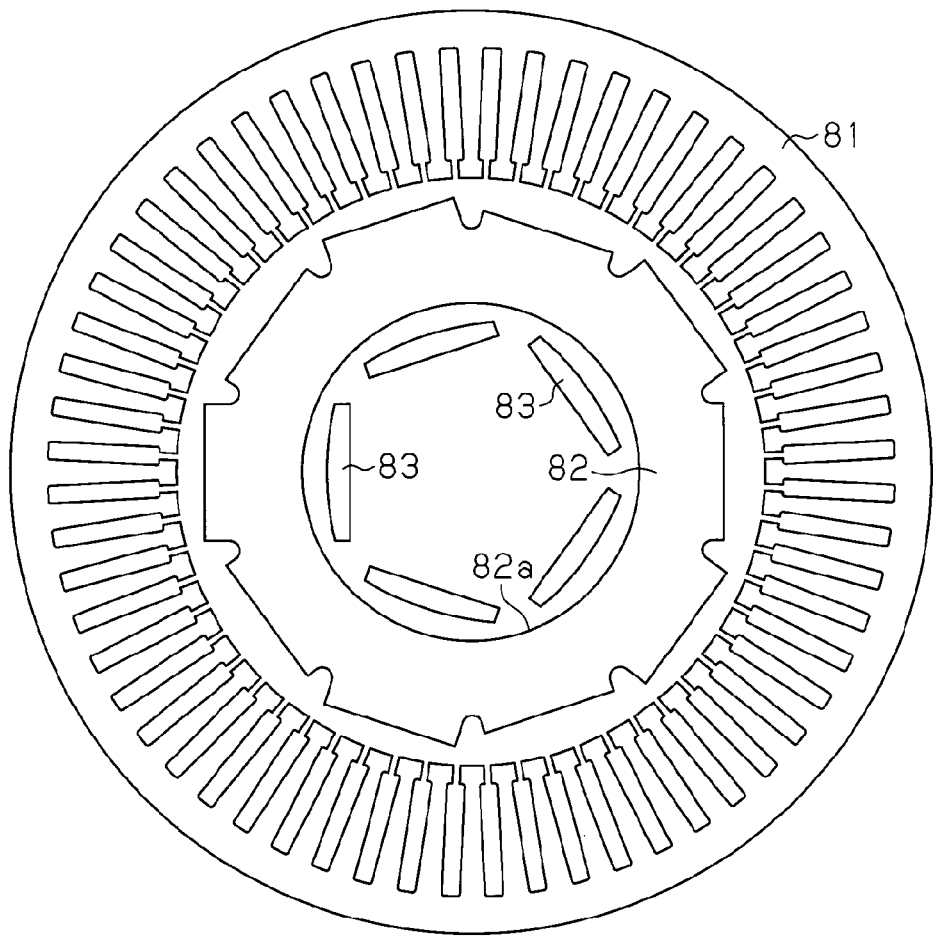
FIG. 14A is a plan view showing a punching step according to a ninth embodiment of the present invention.

A ninth embodiment of the present invention will now be described with reference to FIGS. 14A and 14B.

Figure 14B:
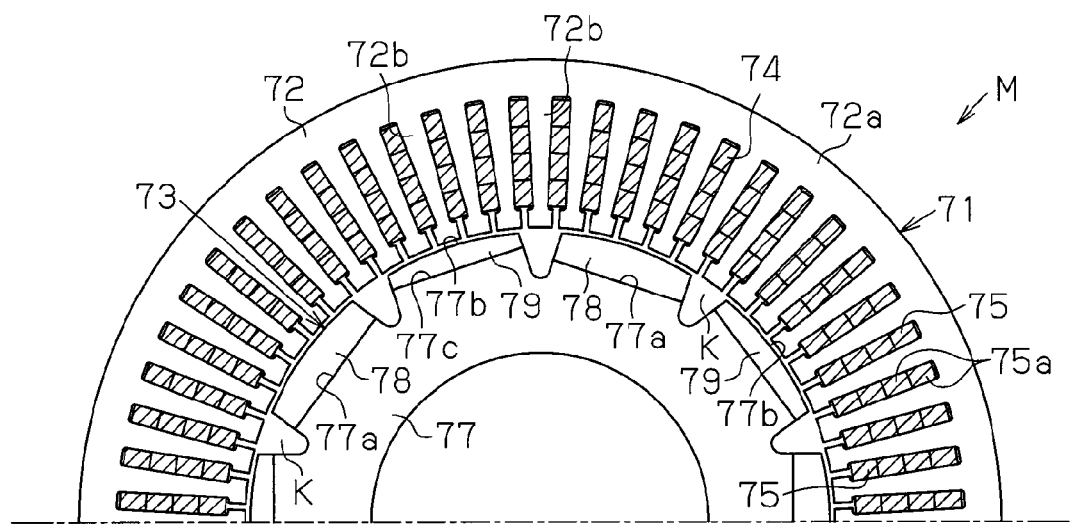
FIG. 14B is a partial plan view showing a motor of FIG. 14A.

As shown in FIG. 14B, a motor M of the ninth embodiment includes a stator 71. The stator 71 includes a stator core 72. The stator 71 includes a cylindrical portion 72a and a plurality of (sixty) teeth 72b. A segment winding 74, which serves as a winding that generates a magnetic field to rotate a rotor 73, is fitted in a slot formed between adjacent teeth 72b.

The segment winding 74 includes a plurality of segment conductors 75. Each segment conductor 75 forms one of multiple phases (three phases). Each segment conductor 75 includes a slot insertion portion 75a and a slot projection portion (not shown). The slot insertion portion 75a is extends through the slot in the axial direction (direction orthogonal to plane of drawing). The slot projection portion projects out of the slot in the axial direction. The segment conductors 75 of the same phase are electrically connected to one another in the circumferential direction at the slot projection portions. Each segment conductor 75 is formed by folding a conductor plate into a U-shape. Two slot insertion portions 75a corresponding to the parallel linear portions of the U-shaped segment conductor 75 are respectively arranged in two slots, which are spaced apart by six teeth 72b in the circumferential direction. Accordingly, the stator 71 is a distributed winding stator including sixty slots.

As shown in FIG. 14B, five magnet seats 77a are formed at intervals of 72° in the circumferential direction along a circumferential portion of a rotor core 77 of the rotor 73. Five N pole magnets 78 are arranged on the magnet seats 77a, respectively. A salient pole 77b is arranged on the circumferential portion of the rotor core 77 between adjacent ones of the magnets 78 in the circumferential direction. The salient pole 77b is separated from the adjacent magnet 78 by a void K, which has the same area when viewed from the axial direction. Accordingly, the magnets 78 and the salient poles 77b are alternately arranged at equal angular intervals of 36°. The rotor 73 is of a so-called consequent pole type and includes ten magnetic poles, in which the salient poles 77b function as S poles and the magnets 78 function as N poles.

Each salient pole 77b (portion projecting outward in the radial direction) is formed by a salient pole member 79, which is molded discretely from the rotor core 77 and fixed to the rotor core 77.

In the ninth embodiment, the rotor core 77 includes a salient pole coupling portion 77c formed in correspondence with each salient pole member 79. The salient pole coupling portion 77c is flat and extends orthogonal to the radial direction. Each salient pole member 79 includes a flat surface adhered to the corresponding salient pole coupling portion 77c and is block-shaped and includes an arcuate surface facing toward the teeth 72b.

The rotor core 77 and the salient pole member 79 are formed from the same material, specifically, iron (SPCC etc.), and manufactured from the same steel plate.

The method for manufacturing the motor M will now be described.

The manufacturing method of the motor M includes a punching step, a stacking step, and a fixing step.

First, referring to FIG. 14B, in the punching step, a stator core plate 81, a rotor core plate 82, and five salient pole member plates 83 are punched out from the same steel plate. In the punching step, the rotor core plate 82 and the salient pole member plate 83 are punched out at the inner side of the stator core plate 81. More specifically, the rotor core plate 82 includes a central hole 82a, and the salient pole member plates 83 are punched out inside the central hole 82a in the punching step.

In the stacking step, stator core plates 81, rotor core plates 82, and salient pole member plates 83 are stacked in plurals to manufacture the stator core 72, the rotor core 77, and the salient pole members 79.

In the fixing step, the salient pole members 79 are adhered and fixed to the salient pole coupling portions 77c of the rotor core 77 (refer to FIG. 14B).

The magnets 78 are fixed to the magnet seats 77a of the rotor core 77 before, after, or during the fixing step (refer to FIG. 14B).

The segment conductors 75 are coupled to the stator core 72 (teeth 72b) with the segment windings 74 (refer to FIG. 14B).

The ninth embodiment has the advantages described below.

(14) In the punching step, the rotor core plate 82 and the salient pole member plates 83 are punched out at the inner side of the stator core plate 81. Thus, the steel plate is used efficiently as compared to when punching out the rotor core plate 82 and the salient pole member plates 83 from different steel plates or when punching out the rotor core plate 82 and the salient pole member plates 83 at the outer side the stator core plate 81.

(15) In the punching step, the salient pole member plates 83 are punched out inside the central hole 82a of the rotor core plate 82. Thus, the steel plate is punched efficiently even when a sufficient space cannot be provided for the salient pole member plates 83 and its punching margin between the stator core plate 81 and the rotor core plate 82. The central hole 82a is large enough to provide sufficient space for the salient pole member plates 83 and its punching margin. If the central hole 82a has such a size, the gap between the salient pole members 79 and the stator core 72 (distal end of teeth 72b) in a state in which the salient pole members 79 are fixed to the rotor core 77 becomes smaller than the punching margin (width necessary for punching). In other words, in the conventional motor in which the salient pole members are integrally molded with the rotor core, the gap between the salient poles and the stator core (distal end of teeth) becomes greater than or equal to the punching margin when punching out the rotor core plate corresponding to the rotor core (including salient poles) at the inner side of the stator core plate. However, the ninth embodiment allows for the gap to be smaller than the punching margin.

Tenth Embodiment

Figure 15A:
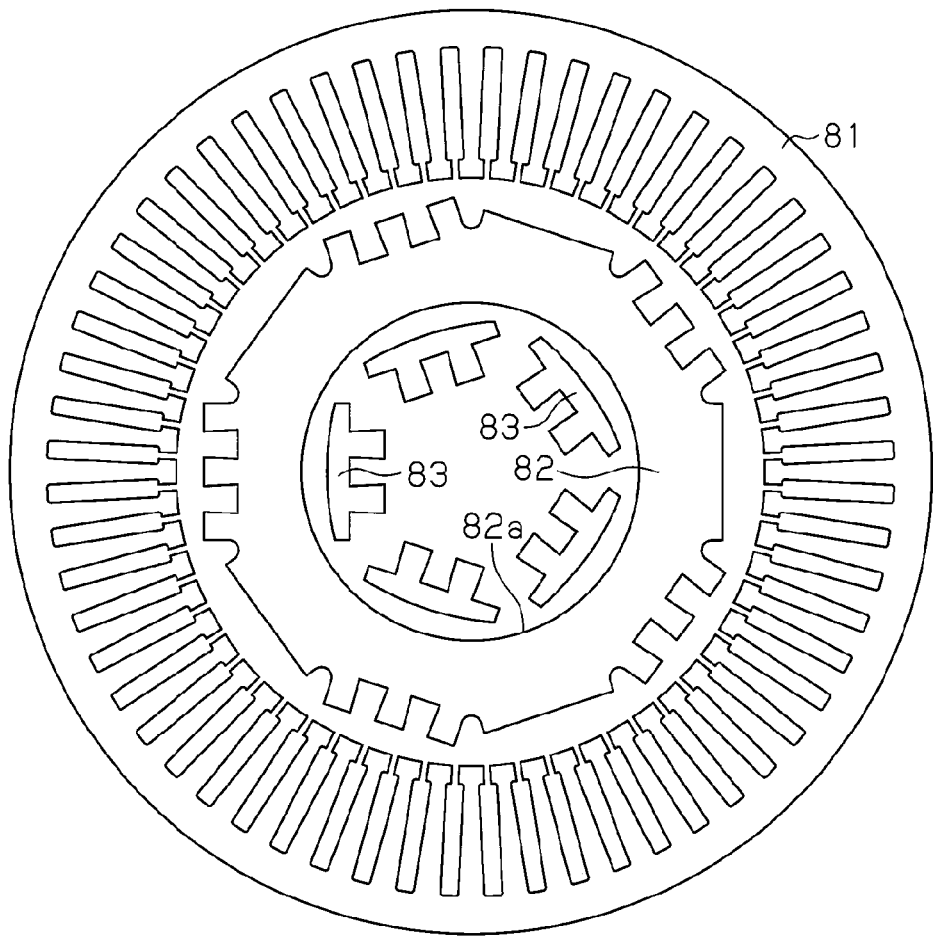
FIG. 15A is a plan view showing a punching step according to a tenth embodiment of the present invention.
Figure 15B:
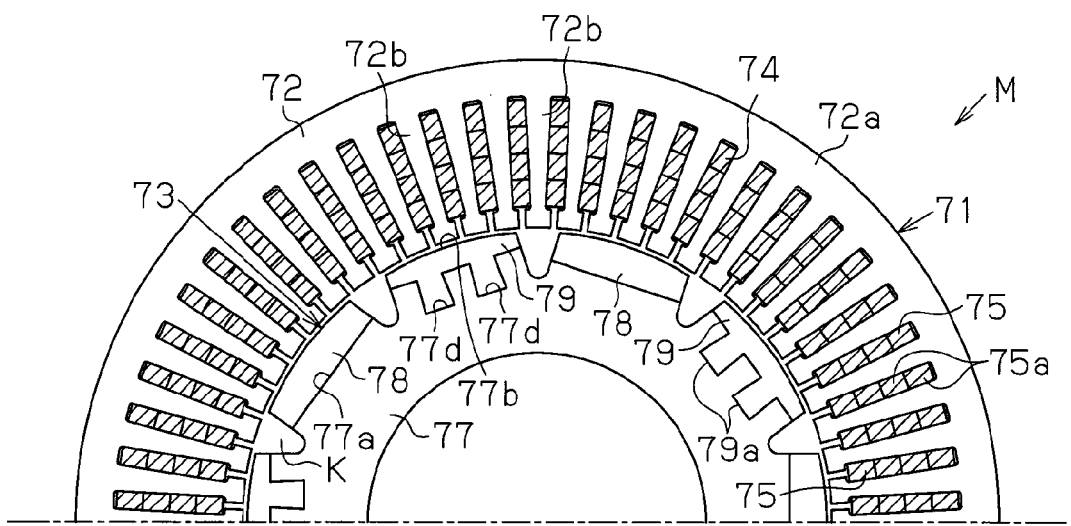
FIG. 15B is a partial plan view showing a motor of FIG. 15A.

A tenth embodiment of the present invention will now be described with reference to FIGS. 15A and 15B. In the tenth embodiment, like or same reference numerals are given to those components that are the same as the corresponding components of the ninth embodiment. Such components will not be described.

In the tenth embodiment, two seat recesses 77d, which extend inward in the radial direction, are arranged next to each other in a portion of a rotor core 77 corresponding to each salient pole member 79. Each salient pole member 79 includes two seat portions 79a that are fitted and fixed to the seat recess 77d. The salient pole 77b projects outward in the radial direction from the seat recesses 77d. The salient pole 77b is separated by a void K from the adjacent one of the magnets 78 in the circumferential direction. The seat recesses 77d and the seat portions 79a are formed so that the width in the direction orthogonal to the radial direction increases inward in the radial direction as viewed from the axial direction. The seat recesses 77d and the seat portions 79a extend throughout the rotor core 77 and the salient pole members 79 in the axial direction. The salient pole members 79 are press-fitted and coupled to the rotor core 77 in a fixing step by moving the salient pole members 79 relative to the rotor core 77 in the axial direction.

The rotor core 77 and the salient pole members 79 are made from the same material, specifically, from iron (SPCC etc.), and manufactured from the same steel plate through a manufacturing method similar to that of the manufacturing method in the ninth embodiment. More specifically, in the punching step of the present example, the stator core plate 81, the rotor core plate 82, and five salient pole member plates 83 are punched out from the same steel plate, as shown in FIG. 15A. In the punching step, the salient pole member plates 83 are punched out inside the central hole 82a of the rotor core plate 82, as shown in FIG. 15A.

The tenth embodiment obtains advantages (14) and (15) of the ninth embodiment.

Eleventh Embodiment

Figure 16A:
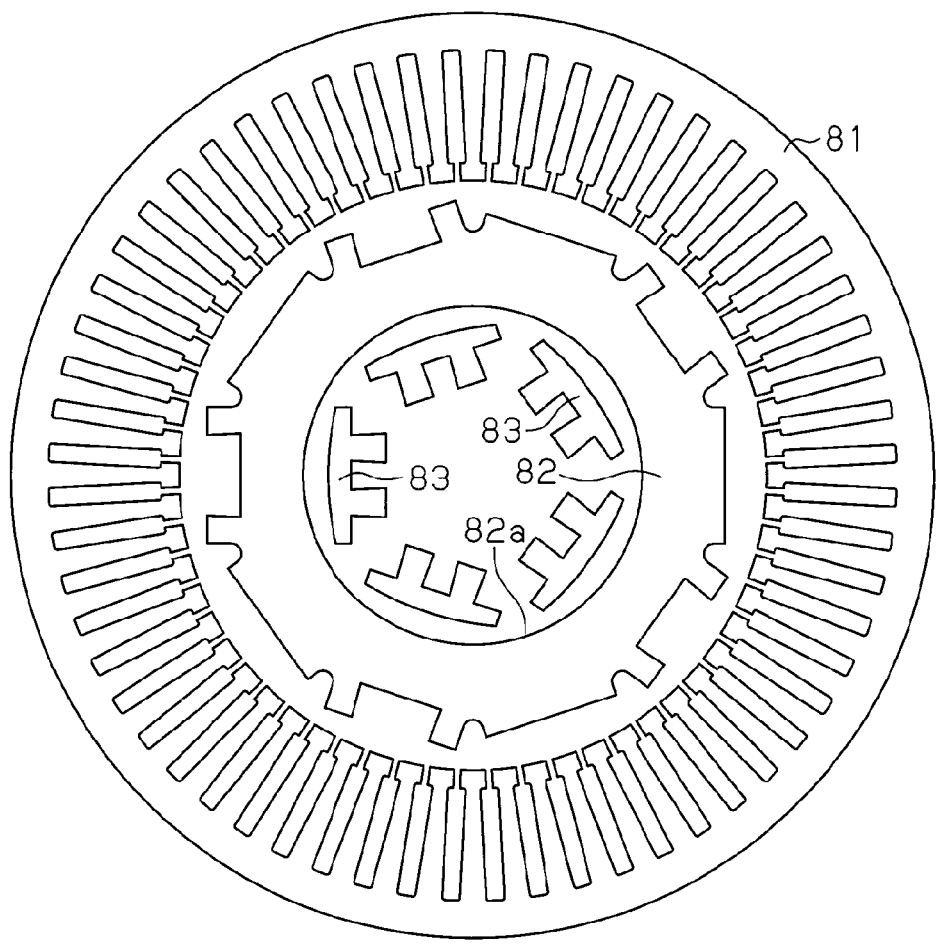
FIG. 16A is a plan view showing a punching step according to an eleventh embodiment.
Figure 16B:
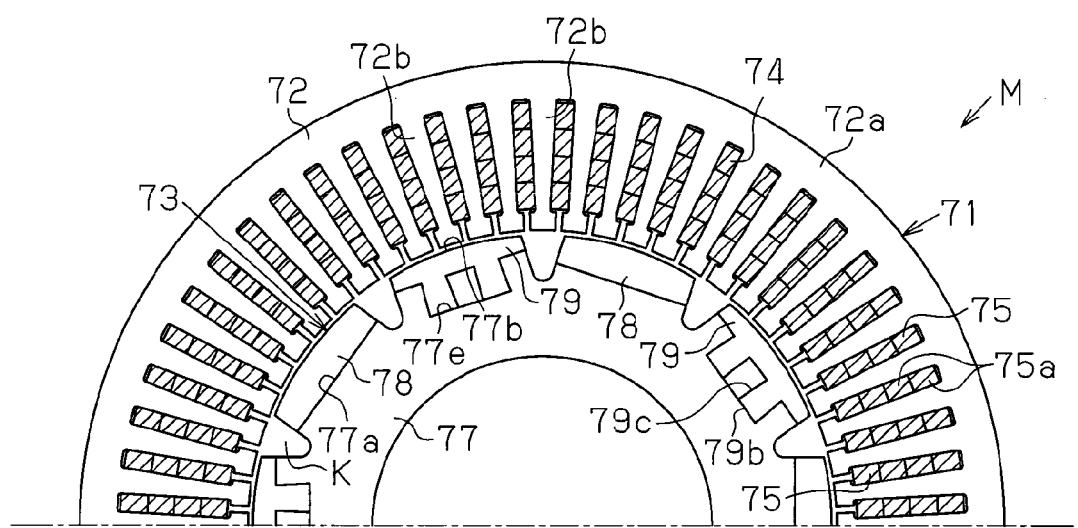
FIG. 16B is a partial plan view showing a motor of FIG. 16A.

An eleventh embodiment of the present invention will now be described with reference to FIGS. 16A and 16B. In the eleventh embodiment, like or same reference numerals are given to those components that are the same as the corresponding components of the ninth embodiment. Such components will not be described.

In the eleventh embodiment, each salient pole member 79 includes a slit 79c extending in the radial direction from the middle of the salient pole member 79 in a direction orthogonal to the radial direction as viewed from the axial direction. The slit 79c, which is formed at a portion corresponding to the seat portion 79b of the salient pole member 79, extends to the radially inward end of the salient pole member 79 and opens at a radially inward side. The seat recesses 77e and seat portions 79b extend throughout the rotor core 77 and the salient pole member 79 in the axial direction. The salient pole members 79 are press-fitted and coupled to the rotor core 77 in a fixing step by moving the salient pole members 79 relative to the rotor core 77 in the axial direction.

The rotor core 77 and the salient pole members 79 are made from the same material, specifically, from iron (SPCC etc.), and manufactured from the same steel plate through a manufacturing method similar to that of the manufacturing method in the ninth embodiment. More specifically, in the punching step of the present example, the stator core plate 81, the rotor core plate 82, and five salient pole member plates 83 are punched out from the same steel plate, as shown in FIG. 16A. In the punching step, the salient pole member plates 83 are punched out inside the central hole 82a of the rotor core plate 82, as shown in FIG. 16A.

The eleventh embodiment obtains advantages (14) and (15) of the ninth embodiment. Further, the slits 79c obtain advantage (5) of the fifth embodiment.

Twelfth Embodiment

A twelfth embodiment of the present invention will now be described with reference to FIGS. 17A and 17B. In the twelfth embodiment, like or same reference numerals are given to those components that are the same as the corresponding components of the ninth embodiment. Such components will not be described.

In the twelfth embodiment, the rotor core plate 82 (FIG. 17B) includes a central hole 82b, which forms a central hole 77f (FIG. 17B) of the rotor core 77. The central hole 82b differs from the central hole 82a (FIG. 17A) of the ninth embodiment in size in that it does not include enough space for the salient pole member plates 83 and there punching margins.

The magnet seats 77a are formed inward in the radial direction from the salient pole coupling portions 77c. The magnet seats 77a and the salient pole coupling portions 77c are names and symbols in the rotor core 77 (see FIG. 17B). To simplify description, the same names and symbols are given to portions corresponding to the magnet seats 77a and the salient pole coupling portions 77c in the rotor core plate 82 (see FIG. 17A).

Figure 17A:
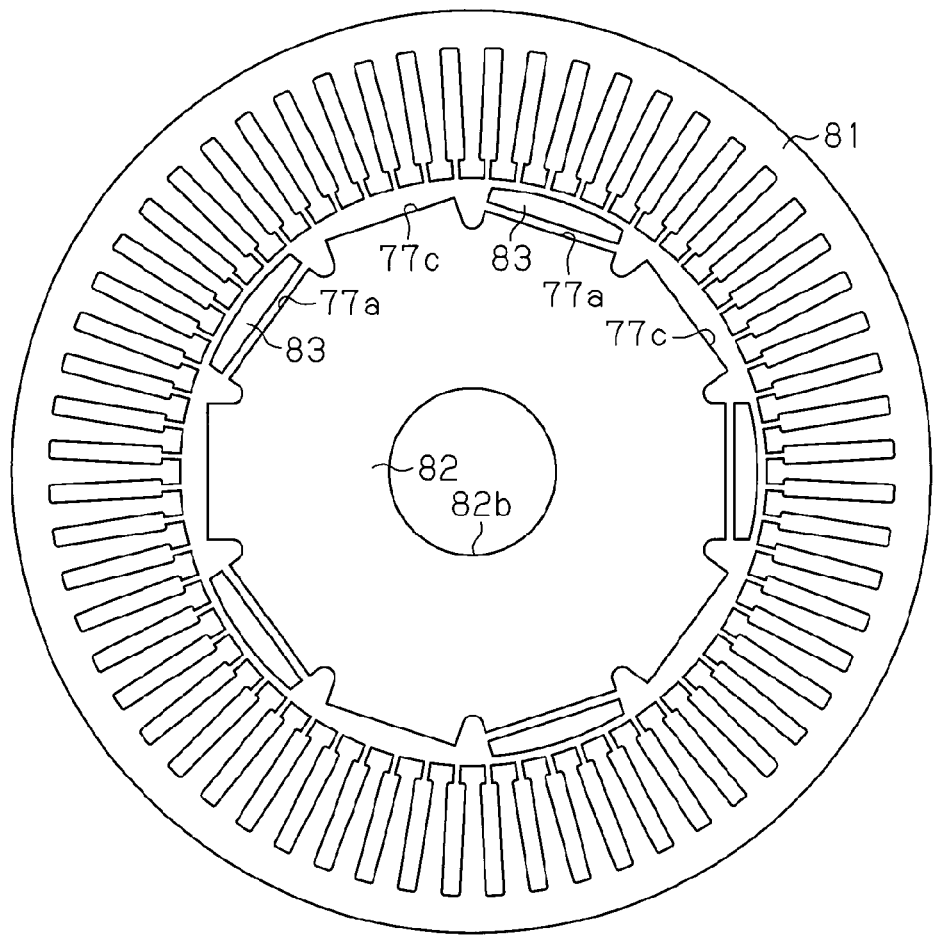
FIG. 17A is a plan view showing a punching step according to a twelfth embodiment.
Figure 17B:
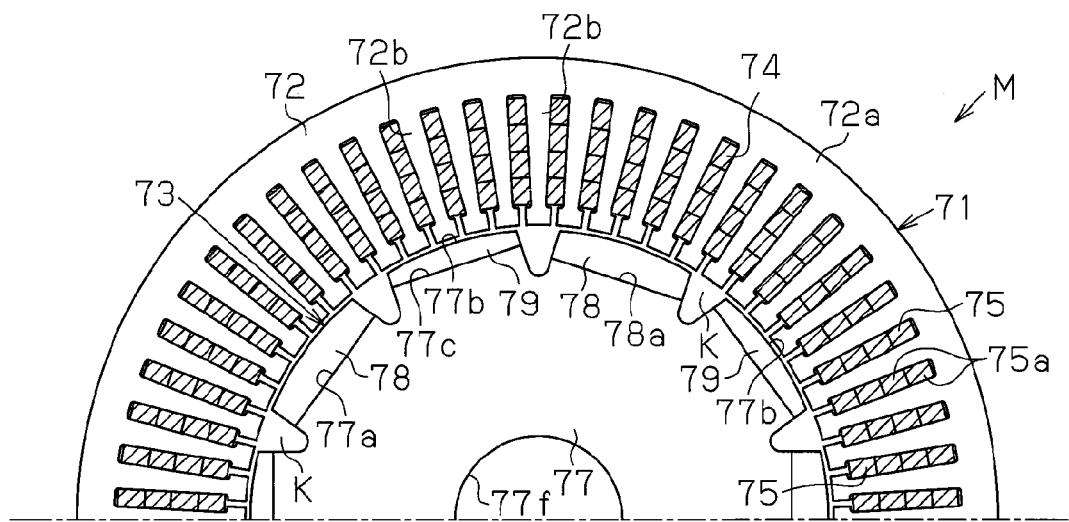
FIG. 17B is a partial plan view showing a motor of FIG. 17A.

As shown in FIG. 17A, in the punching step of the present example, the salient pole member plates 83 are punched out from between the stator core plate 81 and the magnet seats 77a of the rotor core plate 82.

The twelfth embodiment has the following characteristic advantage.

(16) In the punching step, the salient pole member plates 83 are punched out from between the stator core plate 81 and the magnet seats 77a of the rotor core plate 82. Thus, the steel plate is punched out efficiently even when there is not enough space in the central hole 82b for the salient pole member plates 83 and its punching margin like in this example. There should be enough space for the salient pole member plates 83 its punching margin between the stator core plate 81 and the magnet seats 77a. This would allow for the gap between the salient pole members 79 and the stator core 72 (distal end of teeth 72b) in a state in which the salient pole members 79 are fixed to the rotor core 77 to be smaller than the punching margin. In other words, in the conventional motor in which the salient pole (member) is integrally molded with the rotor core, the gap between the salient pole and the stator core (distal end of teeth) is greater than or equal to the punching margin when punching out the rotor core plate corresponding to the rotor core (include salient pole) at the inner side of the stator core plate. However, the tenth embodiment allows for the gap to be smaller than the punching margin.

The third to eighth embodiments may be modified as below.

In the third to eighth embodiments, although not particularly mentioned, the salient pole members 24, 45, and 51 may be manufactured by stacking steel plates (salient pole member plate), by performing SMC molding, by machining soft magnetic iron, or the like.

A thirteenth embodiment of the present invention will now be described with reference to FIGS. 18 and 19. In the thirteenth embodiment, like or same reference numerals are given to those components that are the same as the corresponding components of the first embodiment. Such components will not be described.

Figure 18:
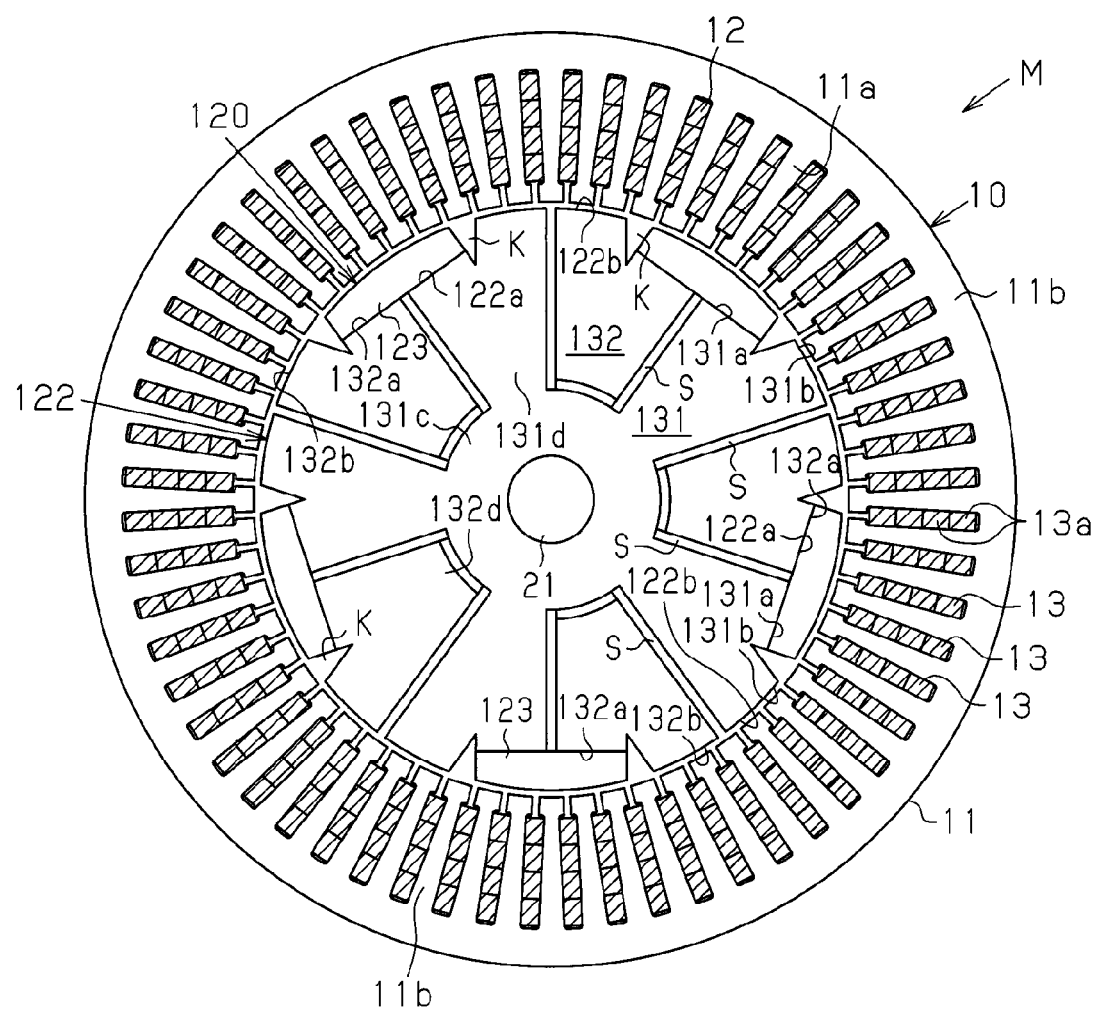
FIG. 18 is a plan view showing a motor according to a thirteenth embodiment of the present invention.

FIG. 18 shows an inner rotor type brushless motor (hereinafter simply referred to as motor) M. As shown in FIG. 18, the stator 10 of the motor M has the same structure as the stator 71 of the ninth embodiment.

As shown in FIG. 18, a rotor 120, which is arranged at the inner side of the stator 10 in the motor M, includes a ring-shaped rotor core 122 that is fitted onto a rotation shaft 21. Five magnet seats 122a are formed on the circumferential portion of the rotor core 122 in the circumferential direction at equal angular intervals. Five N pole magnets 123 are arranged on the magnet seats 122a, respectively. A salient pole 122b is arranged on the circumferential portion of the rotor core 122 between adjacent magnets 123. A void J is formed between the salient pole 122b and the adjacent magnet 123. The voids K have the same area as viewed from the axial direction. Thus, the magnets 123 and salient poles 122b are alternately arranged at equal angular intervals of 36°. The rotor 20 is of a so-called consequent pole type including ten magnetic poles in which the salient poles 122b function as S poles and the magnets 123 function as N poles.

Figure 19:
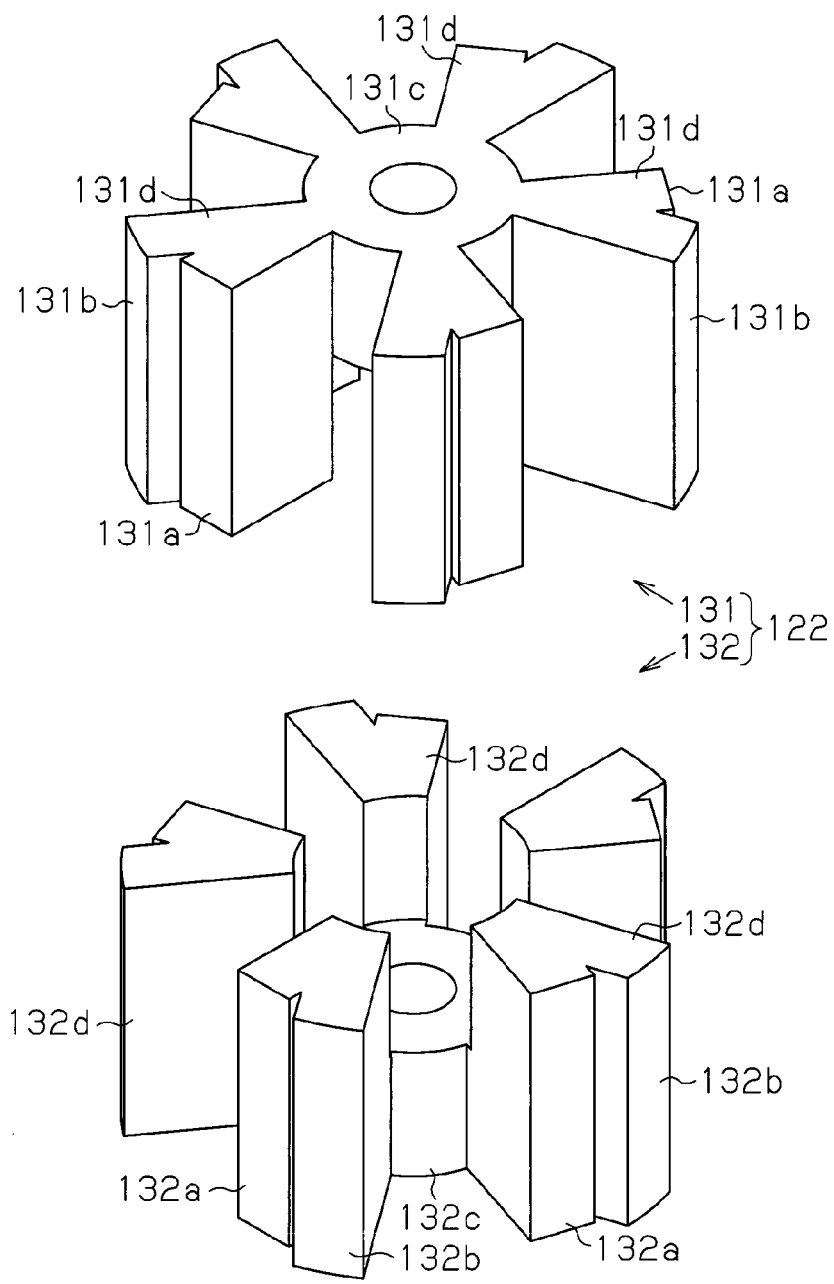
FIG. 19 is an exploded perspective view showing a rotor core of FIG. 18.

As shown in FIGS. 18 and 19, the rotor core 122 of the thirteenth embodiment includes a first core member 131 and a second core member 132, which are arranged on the same plane and magnetically separated from each other.

Specifically, the first core member 131 includes first seat portions 131a and first salient pole portions 131b. Each first seat portion 131a is located at the preceding side of the corresponding magnet seat 122a in a first circumferential direction (clockwise direction in FIG. 18) as viewed from the axial direction. Each first salient pole portion 131b is located at the succeeding side, in the first circumferential direction, of the corresponding salient pole 122b adjacent to the corresponding first seat portion 131a in the first circumferential direction. As shown in FIGS. 18 and 19, the first core member 131 is a single component including an annular first press-fit portion 131c, which serves as a first central portion arranged at the inner side of the rotor core 122 in the radial direction and at the first axial side of the rotor core 122 (upper side as viewed in FIG. 19). Accordingly, the first core member 131 includes five blocks 131d extending from the first press-fit portion 131c in the radial direction. Each block 131d includes the first seat portion 131a and the first salient pole portion 131b.

The second core member 132 includes second seat portions 132a and second salient pole portions 132b. Each second seat portion 132a is located at the succeeding side of the corresponding magnet seat 122a in the first circumferential direction as viewed from the axial direction. Each second salient pole portion 132b is located at the preceding side, in the first circumferential direction, of the corresponding salient pole 122b adjacent to the second seat portion 132a in a direction opposite to the first circumferential direction. As shown in FIGS. 18 and 19, the second core member 132 is a single component including an annular second press-fit portion 132c, which serves as a second central portion arranged at the inner side of the rotor core 122 in the radial direction and at the second axial side of the rotor core 122 (lower side as viewed in FIG. 19). Accordingly, the second core member 132 includes five blocks 132d extending from the second press-fit portion 132c in the radial direction. Each block 132d includes the second seat portion 132a and the second salient pole portion 132b. The first core member 131 and the second core member 132 are formed by sintering magnetic powder.

The first and second press-fit portions 131c and 132c are stacked in the axial direction. Further, the blocks 131d and 132d are alternately arranged with a slight space S (FIG. 18) provided in between in the circumferential direction. As a result, the first core member 131 and the second core member 132 form the rotor core 122. In this case, each first seat portion 131a is arranged next to the corresponding second seat portion 132a with the space S provided in between. This forms a single magnet seat 122a. Each first salient pole portion 131b is arranged next to the second salient pole portion 132b with the space S provided in between. This forms a single salient pole 122b. The seat portions 131a have the same circumferential width as the second seat portions 132a. The space S is formed at the middle of each magnet seat 122a in the circumferential direction. The salient pole portions 131b have the same circumferential width as the second salient pole portions 132b. The space S is formed at the middle of each salient pole 122b in the circumferential direction. Each magnet 123, which is block-shaped and includes an arcuate radially outer side, is fixed to the corresponding magnet seat 122a (first and second seat portions 131a and 132a). The rotation shaft 21 is press-fitted into the first and second press-fit portions 131c and 132c.

The thirteenth embodiment has the advantages described below.

(17) The first core member 131 includes the first seat portions 131a and the first salient pole portions 131b. Each first seat portion 131a is located at the preceding side of the corresponding magnet seat 122a in the first circumferential direction. Each first salient pole portion 131b is located at the succeeding side of the corresponding salient pole 122b, which is adjacent to the first seat portion 131a, in the first circumferential direction. The second core member 132 includes the second seat portions 132a and the second salient pole portions 132b. Each second seat portion 132a is located at the succeeding side of the corresponding magnet seat 122a in the first circumferential direction. Each second salient pole portion 132b is located at the preceding side of the corresponding salient pole 122b, which is adjacent to the second seat portion 132a in a direction opposite to the first circumferential direction, in the first circumferential direction. The first core member 131 and the second core member 132 are arranged on the same plane and magnetically separated from each other to form the rotor core 122. Thus, the flow of magnetic flux from the first seat portions 131a to the second salient pole portions 132b is suppressed, and the flow of the magnetic flux from the second seat portions 132a to the first salient pole portions 131b is suppressed. This suppresses the bias in the flow of the magnetic flux. In other words, the magnetic flux ideally flows from the first seat portions 131a to the first salient pole portions 131b, and the magnetic flux ideally flows from the second seat portions 132a to the second salient pole portions 132b. Thus, an ideal flow of the magnetic flux is obtained. This improves the magnetic balance of the rotor 120 and improves rotational characteristics, such as torque characteristics and vibration characteristics. Further, higher torque is obtained since the salient pole ratio is close to one.

(18) The first core member 131 and the second core member 132 are single components. This facilitates component management and assembly.

The thirteenth embodiment may be modified as below.

Figure 20:
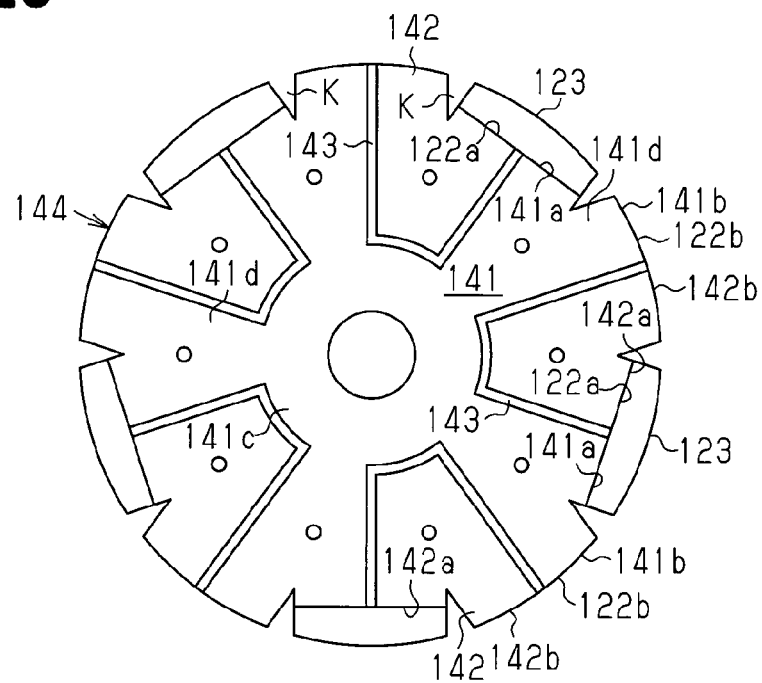
FIG. 20 is a plan view showing a rotor according to another example.
Figure 21:
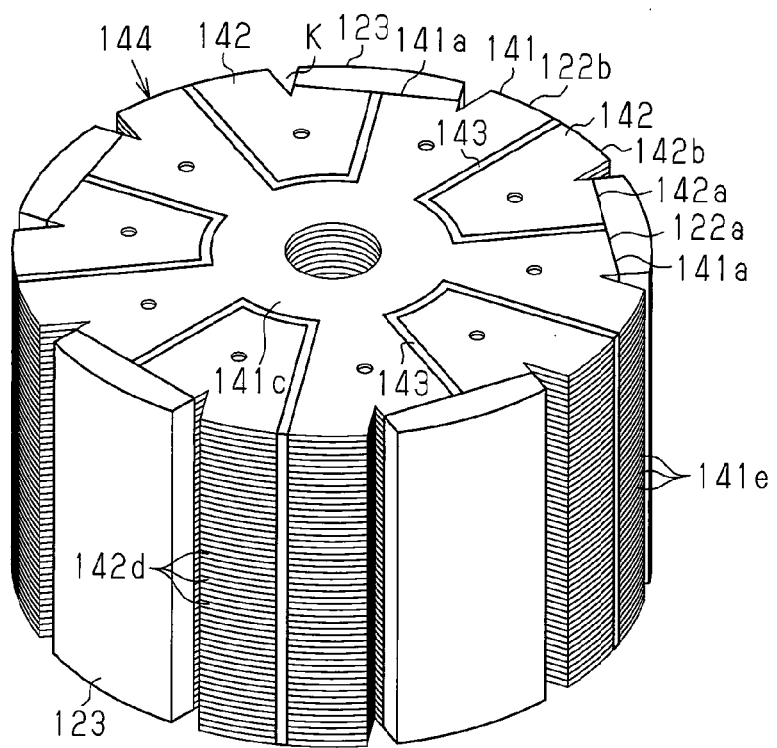
FIG. 21 is a perspective view showing the rotor of FIG. 20.

In the thirteenth embodiment, the first core member 131 and the second core member 132 are formed as single components but are not limited to such a structure. At least one of the first core member 131 and the second core member 132 may be formed by a plurality of components as shown in FIGS. 20 and 21.

In this example, a first core member 141 (FIGS. 20 and 21) includes blocks 141d, which are similar to the block 131d of thirteenth embodiment. Each block 1414 includes a first seat portion 141a and a first salient pole portion 141b. The first core member 141 is a single component including an annular first press-fit portion 141c, which serves as a first central portion, and has the same shape throughout the axial direction.

The second core member 142 (FIGS. 20 and 21) includes a plurality of components. Each component forms a block similar to the block 132d of the thirteenth embodiment. More specifically, each component includes only one second seat portion 142a and one second salient pole portion 142b, which are similar to those of the thirteenth embodiment and have the same shape throughout the axial direction. Accordingly, each component is formed by a bock that is similar to the block 132d of the twelfth embodiment.

A non-magnetic body 143 fixes the first core member 141 and the second core member 142 so that the first core member 141 and the second core member 142 are magnetically separated on the same plane. The non-magnetic body 143 is arranged at a location that magnetically separates the first core body 141 and the second core body 142. The first core member 141 and the second core member 142 are formed by stacking core sheets 141*e* and 142*d*, respectively (FIG. 21). The non-magnetic body 143 is formed from a resin material and is integrally molded to fix the first core member 141 and the second core member 142.

This example has advantage (17) of the thirteenth embodiment. Further, the first core member 141 is a single component. This facilitates component management and assembly. In addition, the first core member 141 and the second core member 142 have the same shape throughout the axial direction. This facilitates manufacturing. In particular, the core sheets 141*e* and 142*d* are stacked thereby facilitating manufacturing. The non-magnetic body 143 is formed from a resin material. Thus, the first core member 141 and the second core member 142 are easily fixed to each other through integral molding. This easily obtains the rotor core 144.

The first and second core members 131 and 132 of the thirteenth embodiment (FIGS. 18 and 19) are formed by sintering magnetic powder particle bodies, and the first and second core members 141 and 142 (FIGS. 20 and 21) are formed by stacking the core sheets 141*e* and 142*d*. However, first and second core members may be obtained through other structures and manufacturing methods, such as machining.

Figure 22:
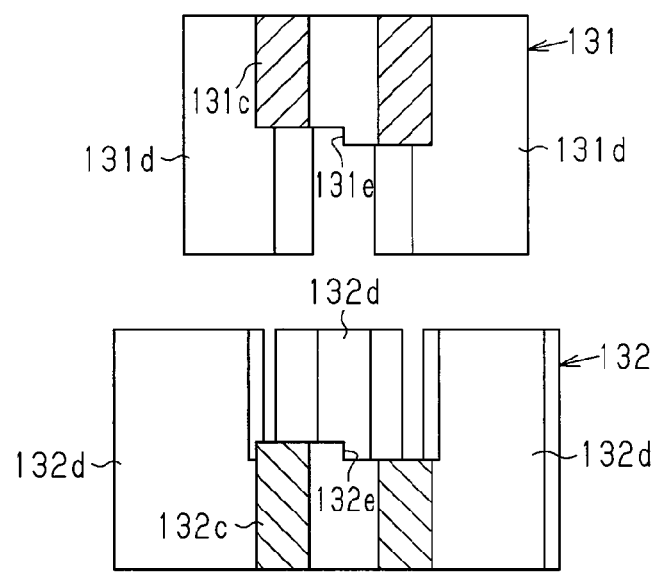
FIG. 22 is an exploded partial cross-sectional view showing the rotor core of FIG. 20.

Although not particularly mentioned in the thirteenth embodiment, as shown in FIG. 22, restriction portions (steps) 131*e* and 132*e*, which restrict relative pivoting, may be arranged on opposing surfaces of the first and second press-fit portions 131*c* and 132*c* of the first and second core members 131 and 132. This maintains the width of the space S with high accuracy.

Figure 23:
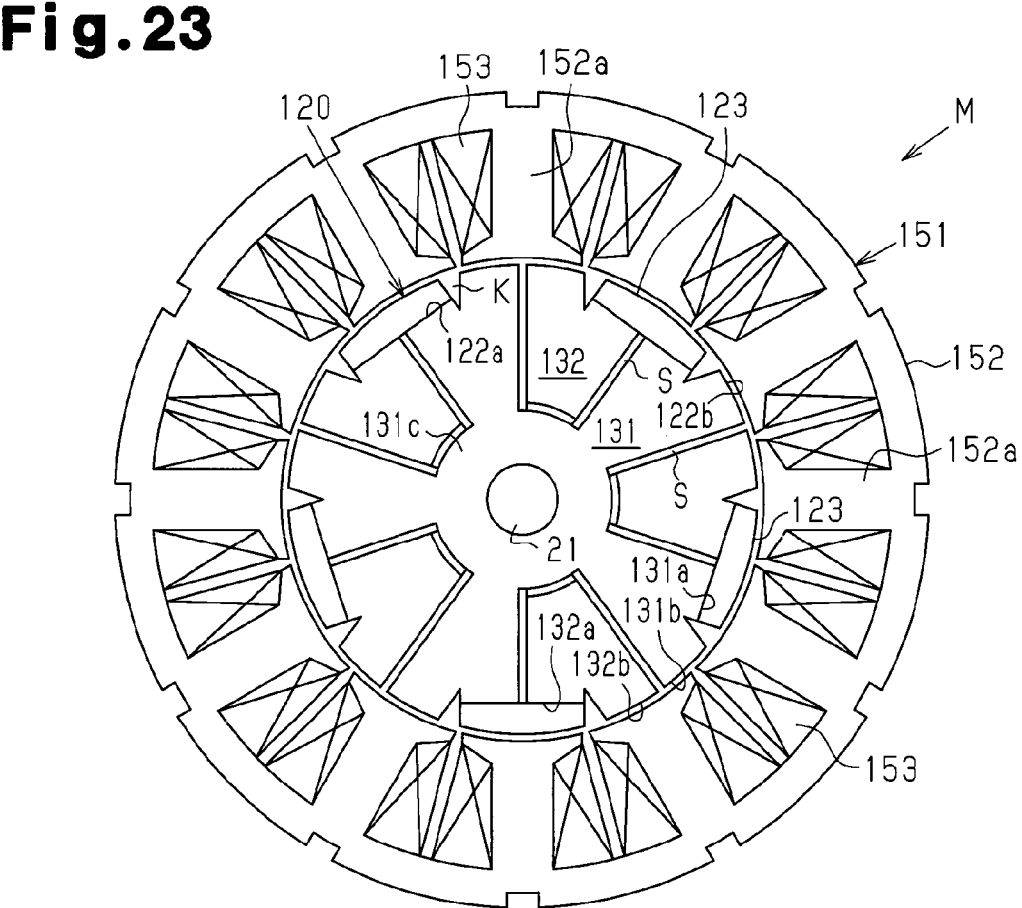
FIG. 23 is a plan view showing a motor according to another example.

The stator 10 of the thirteenth embodiment includes distributed windings in sixty slots but is not limited to such a structure and may be changed, for example, to a stator including concentrated windings in twelve slots, as shown in FIG. 23. More specifically, in this example (FIG. 23), a stator 151 includes a stator core 152. Twelve teeth 152*a*, which extend inward in the radial direction, are arranged along the circumferential direction of the stator 151. A winding 153 is wound around each tooth 152*a* for concentrated winding. This obtains the same advantages as the thirteenth embodiment. In the thirteenth embodiment, the present invention is applied to the motor M (i.e., motor including ten magnetic poles) that includes five magnets 123 (salient poles 122*b*). However, the present invention may also be applied to a motor including a different number of magnetic poles. In this case, the number of slots is in accordance with the number of magnetic poles.

In the thirteenth embodiment, the first core member 131 and the second core member 132 are magnetically separated on the same plane by the space S. However, a non-magnetic body may be arranged where magnetic separation occurs (portion where space S is located). This increases the rigidity compared to when the space S is used for magnetic separation.

This non-magnetic body and the non-magnetic body 143 of the example described above and illustrated in FIGS. 20 and 21 may be formed from another non-magnetic body (non-magnetic material), for example, elastomer. When the non-magnetic body is formed elastomer, vibration of the rotor is reduced.

In the thirteenth embodiment, the first seat portions 131*a* and the second seat portions 132*a* have the same circumferential width but are not limited to such a structure and may have different circumferential widths. In the thirteenth embodiment, the first salient pole portions 131*b* and the second salient pole portions 132*b* have the circumferential width but are not limited to such a structure and may have different circumferential widths.

The present invention may be modified as described below.

In the first to thirteenth embodiments, all voids K have the same area as viewed from the axial direction but are not limited in such a manner. For instance, in a motor that produces rotation in only one direction, the void K at the preceding side of a magnet and the void K at the succeeding side of the magnet in the rotation direction may have different areas.

The number of teeth and the number of magnets (salient poles) in the first to thirteenth embodiments may be varied.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A rotor comprising:
   a rotor core;
   a plurality of magnets arranged along a circumferential direction of the rotor core functioning as first magnetic poles; and
   a plurality of salient poles arranged on the rotor core and functioning as second magnetic poles, wherein each of the salient poles is separated by a void from an adjacent one of the magnets in the circumferential direction;
   wherein the salient poles are set to be longer in an axial direction than a magnet pole portion, which is formed at a radially outward side of the rotor in correspondence with each of the magnets; and
   wherein the salient poles project from an axial end of the rotor core.

2. A motor comprising:
   a rotor including:
      a rotor core,
      a plurality of magnets arranged along a circumferential direction of the rotor core and functioning as first magnetic poles, and
      a plurality of salient poles arranged on the rotor core and functioning as second magnetic poles, wherein each of the salient poles is separated by a void from an adjacent one of the magnets in the circumferential direction,
      wherein the salient poles are set to be longer in an axial direction than a magnet pole portion, which is formed at a radially outward side of the rotor in correspondence with each of the magnets; and
   a stator arranged outward in a radial direction from the rotor, wherein the stator includes a plurality of teeth, which extend inward in the radial direction toward the rotor and are arranged along a circumferential direction, and a plurality of windings, which are wound around the teeth;
      wherein the salient poles are projected in the axial direction from the magnet pole portion by a projecting amount C, and the stator and the rotor are separated from each other in the radial direction by distance B, a ratio C/B is set to satisfy $0<(C/B)<2$.

* * * * *

UNITED STATES PATENT AND TRADEMARK OFFICE
CERTIFICATE OF CORRECTION

PATENT NO. : 9,667,107 B2
APPLICATION NO. : 14/288099
DATED : May 30, 2017
INVENTOR(S) : Yamada et al.

Page 1 of 1

It is certified that error appears in the above-identified patent and that said Letters Patent is hereby corrected as shown below:

On page 2, in Column 1, under "Foreign Patent Documents", Line 9, delete "WO-2009/101874 A1" and insert --WO-2009/101674 A1-- therefor In Column 18, Line 32, in Claim 1, after "core", insert --and--

Signed and Sealed this
Eighth Day of May, 2018

Andrei Iancu
*Director of the United States Patent and Trademark Office*